United States Patent
Young et al.

(10) Patent No.: US 7,431,570 B2
(45) Date of Patent: *Oct. 7, 2008

(54) CAPILLARY PUMPS FOR VAPORIZATION OF LIQUIDS

(75) Inventors: Thomas M. Young, Richmond, CA (US); Mark Richardson, San Francisco, CA (US); Robert A. Lerner, Berkeley, CA (US); Barry H. Rabin, Idaho Falls, ID (US)

(73) Assignee: Vapore, Inc., Alameda, CA (US)

( * ) Notice: Subject to any disclaimer, the term of this patent is extended or adjusted under 35 U.S.C. 154(b) by 587 days.

This patent is subject to a terminal disclaimer.

(21) Appl. No.: 10/691,067

(22) Filed: Oct. 21, 2003

(65) Prior Publication Data

US 2004/0151598 A1 Aug. 5, 2004

Related U.S. Application Data

(63) Continuation-in-part of application No. 10/079,744, filed on Feb. 19, 2002, now Pat. No. 6,634,864.

(51) Int. Cl.
*F04B 19/24* (2006.01)
*F04F 1/18* (2006.01)

(52) U.S. Cl. .................. 417/208; 417/207; 137/833

(58) Field of Classification Search .......... 417/207, 417/208, 199.2, 307; 431/208; 137/833; 219/200

See application file for complete search history.

(56) References Cited

U.S. PATENT DOCUMENTS

| | | | |
|---|---|---|---|
| 3,262,290 A | 7/1966 | Huber | |
| 3,820,540 A | 6/1974 | Hirtz et al. | |
| 3,869,242 A * | 3/1975 | Schladitz | 431/11 |
| 4,325,345 A * | 4/1982 | Wilkinson et al. | 123/557 |
| 4,365,952 A | 12/1982 | Ohmukai et al. | |
| 4,552,124 A | 11/1985 | Nakajima | |
| 4,571,481 A | 2/1986 | Leary | |
| 4,684,341 A | 8/1987 | Kawamura et al. | |
| 4,857,421 A | 8/1989 | Ernst | 429/104 |
| 4,937,053 A * | 6/1990 | Harvey | 117/210 |
| 5,039,351 A | 8/1991 | Cooper et al. | 136/202 |
| 5,113,478 A | 5/1992 | Nakashima et al. | |
| 5,228,922 A | 7/1993 | Sievers | 136/202 |
| 5,692,095 A | 11/1997 | Young | |
| 5,870,525 A | 2/1999 | Young | |
| 5,928,436 A | 7/1999 | Borkowski et al. | 136/205 |
| 5,929,371 A | 7/1999 | Svedberg et al. | 136/204 |
| 5,939,666 A | 8/1999 | Sievers et al. | 136/205 |
| 5,940,577 A | 8/1999 | Steinel | |
| 5,998,728 A | 12/1999 | Sievers et al. | 136/205 |
| 6,162,046 A * | 12/2000 | Young et al. | 431/11 |
| 6,169,852 B1 | 1/2001 | Liao et al. | |
| 6,347,936 B1 | 2/2002 | Young et al. | |
| 6,634,864 B1 * | 10/2003 | Young et al. | 417/208 |

* cited by examiner

*Primary Examiner*—Devon Kramer
*Assistant Examiner*—Peter J Bertheaud
(74) *Attorney, Agent, or Firm*—Sharon R. Kantor

(57) ABSTRACT

A capillary pump is provided for producing pressurized and unpressurized vapor emissions from liquid feed. In its simplest form, the capillary pump incorporates a liquid feed intake, a porous vaporization component, and a heat transfer component. Additional components, such as an insulator component, a feed pre-heat component, a liquid feed reservoir and/or delivery system, an integrated or associated heater component, a vapor collection chamber, a heat distribution component, an orifice component and/or vapor release component, may also be associated with or integrated in the improved capillary pumps. Capillary pump arrays are provided, and numerous applications for capillary pumps are disclosed.

4 Claims, 17 Drawing Sheets

CAPILLARY PUMPS FOR VAPORIZATION OF LIQUIDS

CROSS REFERENCE TO RELATED APPLICATION

This application is a continuation-in-part application from U.S. patent application Ser. No. 10/079,744, filed Feb. 19, 2002, issued as U.S. Pat. No. 6,634,864 on Oct. 21, 2003.

FIELD OF THE INVENTION

The present invention relates to vaporization of liquid in a capillary pump and improved capillary pumps for producing vapor for a variety of applications.

BACKGROUND

Many applications utilize gases that have been generated from liquid sources. Vaporization devices have been designed to vaporize liquids and release the resulting vapor under pressure. In applications in which a pressurized vapor stream is desired, prior art devices generally require that liquid be supplied to the device under pressure, or the vapor is otherwise pressurized by external means. For example, in a pressurized boiler system, the liquid is generally required to be supplied under at least as much pressure as that of the produced vapor. Pressurized liquid sources are usually inconvenient to use, heavy to transport, potentially explosive, and prone to leakage. It would be desirable, for many applications, to produce a pressurized vapor stream from a liquid at ambient pressure, or at a relatively low pressure.

In most liquid fuel vaporization applications, liquid fuel is vaporized, then mixed with air or an oxygen-containing gas, and the vaporized fuel/gas mixture is ignited and burned. The liquid fuel is generally supplied under pressure, and atomized by mechanical means or heated to vaporization temperatures using an external energy source. It would be desirable, for combustion applications in particular, to produce a pressurized vapor stream from a liquid fuel provided at ambient, or relatively low, pressure.

Portable burners and light sources that utilize liquid fuels generate liquid fuel vapor, which is then mixed with air and combusted. Combustion devices that burn fuels that are liquids at atmospheric temperatures and pressures, such as gasoline, diesel fuel and kerosene, generally require the liquid fuel to be pressurized by a pump or other device to provide vaporized fuel under pressure. Fuels such as propane and butane, which are gases at atmospheric pressures but liquids at elevated pressures, can also be used in portable burners and light sources. Storage of these fuels in a liquid form necessitates the use of pressurized fuel canisters that are inconvenient to use and transport, are frequently heavy, may be explosion hazards, require expensive valves which are prone to leaking, and are facing increasing regulatory pressure and disposal costs.

The fuel boiler of propane and butane burners is the reservoir or storage tank itself, from which the gases are released under pressure as vapor. When vapor is withdrawn from the fuel reservoir, the pressurized reservoir acts as a boiler, and draws the required heat of vaporization from ambient air outside the tank. These systems have many disadvantages. The vapor pressure of propane inconveniently depends upon ambient temperature, and the vapor pressure is generally higher than that needed for satisfactory combustion in a burner. While butane fuel has an advantageous lower vapor pressure than propane, burners using butane have difficulty producing sufficient vapor pressure at low ambient temperatures. Burners using a mixture of propane and butane fuel provided under pressure in disposable canisters have also been developed. This fuel mixture performs well at high altitudes, but still does not perform well at low ambient temperatures.

A needle valve can be used to control propane vapor at tank pressure to regulate the fuel flow, and thus the heat output, of a burner. Burner control using a needle valve tends to be delicate and sensitive to ambient temperatures. Alternatively, a pressure regulator can be used to generate a constant and less hazardous pressure of propane that is independent of tank temperature. Propane pressure regulators are commonly used in outdoor grills, appliances for recreational vehicles and boats, and domestic propane installations. Unfortunately, regulators are bulky and are seldom practical for application to small-scale portable burner devices.

Despite considerable development efforts and the high market demand for burners for use in stoves, lamps and the like, that operate safely and reliably under a wide variety of ambient temperature, pressure and weather conditions, commercially available combustion devices are generally unsatisfactory.

Wicking systems that use capillary action to convey and vaporize liquid fuels at atmospheric pressure are known for use in liquid fuel burners. U.S. Pat. No. 3,262,290, for example, discloses a liquid fuel burner in which a wick stone is fastened in a fuel storage container and feeds liquid fuel from the fuel reservoir to the burner. In this system, liquid fuel is provided to the wick stone by an absorbent textile wick, and the wick stone is biased against a burner wick.

U.S. Pat. No. 4,365,952 discloses a liquid fuel burner in which liquid fuel is drawn up from a reservoir by a porous member having a fuel receiving section and a fuel evaporation section. Liquid fuel is supplied by capillary action at a rate matching the rate of evaporation of the fuel. Air is supplied to the fuel evaporation section, and liquid fuel is evaporated from the surface at a rate corresponding to the rate of air supply. The gaseous fuel and air is mixed and jetted from a flame section to a burning section. An externally powered heater maintains the porous member of the fuel evaporation section substantially at a constant temperature irrespective of the rate of evaporation of the liquid fuel.

U.S. Pat. No. 4,421,477 discloses a combustion wick comprising a fuel absorption and a fuel gasifying portion designed to reduce the formation and deposition of tar-like substances in the wick. The wick comprises silica-alumina ceramic fibers molded with an organic binder, with part of the wick provided with a coating of an inorganic pigment, silicic anhydride and a surface active agent. The wick may have a capillary pore size of about 1 to 50 microns, with smaller pore size wicks being less prone to accumulation of tar-like substances on the inside.

U.S. Pat. No. 4,465,458 discloses a liquid fuel combustion system in which the liquid fuel is drawn into a porous fiber material or fabric, which is intimately contacted by an externally powered heat generating member to evaporate and vaporize the liquid fuel. Air is introduced to promote vaporization of the liquid fuel and provide an admixed liquid/fuel mixture for burning. Combustion is variable by adjusting the heat input and the air supply.

U.S. Pat. No. 4,318,689 discloses a burner system in which liquid fuel is pumped into a cylindrical chamber having a porous sidewall. As a result of the pressure differential, the liquid fuel penetrates the porous wall to form a film on the external surface of the porous chamber wall. Preheated combustion air entrains and vaporizes the liquid fuel film formed on the external wall of the chamber, and circulates the fuel/air mixture to a combustion chamber. A portion of the hot exhaust or combustion gases may be returned for countercurrent heat exchange to preheat the combustion air.

U.S. Pat. Nos. 5,692,095, 5,870,525, 6,162,046, 6,347,936, 6,585,509 and 6,634,864 are incorporated by reference herein in their entireties and relate to predecessor capillary pump modules and systems having a capillary member for vaporizing and pressurizing liquids in a porous material. The capillary member has low thermal conductivity and small-sized pores that permit liquid to travel by capillary action toward the vaporization zone. The modules include an orifice plate having one or more orifices permitting the release of pressurized vapor and a sealing member forming at least a partial enclosure of the module, allowing vapor to accumulate and pressure to increase within the module.

The present invention contemplates further developments of and improvements to these types of capillary pumps. Specifically, the present invention involves the application of new materials combinations, new device architectures and methods of construction, and incorporation of entirely new features previously unanticipated. These improvements provide capillary pumps having substantially reduced manufacturing costs, increased performance, expanded ranges of utility in terms practical size, output, and substances that can be vaporized, as well as new functionality not achievable by the prior art.

SUMMARY OF THE INVENTION

Capillary pumps are provided for producing vapor emissions from liquid and/or solid materials. During operation of a capillary pump, liquid is drawn through the pump by capillary forces from a generally low temperature, low pressure liquid feed source. The liquid is heated and converted to vapor in a vaporizer layer, and vapor is released from the capillary pump as a controllable vapor emission or as a pressurized jet. Heat travels in the reverse direction from fluid flow, from the vaporization zone of the capillary pump toward the liquid intake region, as a cooling flow of liquid travels toward the vapor release area, resulting in a dynamic balance of heat flux, liquid flow and evolved gas. Capillary pumps of the present invention produce pressurized or unpressurized vapor from unpressurized liquid in a compact, lightweight, reliable, safe, integrated device having no moving parts. Capillary pumps of the present invention also have the advantage of being operable in any orientation, provided that liquid supply is available to a liquid feed surface of the capillary pump.

Such capillary pumps have numerous practical applications for vaporizing liquid fuel in combustion applications such as heating and lighting applications, as well as vapor/fuel carburetion applications, fuel cells and fuel reformers, micro turbines, and in thermal to electric energy conversion applications.

Vaporization of liquids other than fuels is also useful for generation of vapor in non-fuel applications, such as dispersal of fragrances, antiseptics, inhalants and other medical compositions, insect repellents and attractants, crop treatments, chemical vapor deposition applications, and the like.

Capillary pumps according to the present invention comprise: (1) a vaporizer component composed of a porous material having a suitably selected combination of liquid permeability and capillary pressure; (2) a heat transfer component for delivering heat to the vaporizer component; and (3) a feed liquid supply interface. Capillary pumps also generally have a structure providing for collection and/or controlled release of vapor. Additional components provide additional and/or different functionality.

The porous vaporizer component comprises a material that has at least one surface in contact with the feed liquid to be vaporized, and at least one surface through which vapor is released. Other surface(s) of the vaporizer component are at least partially sealed with a material that is substantially impermeable to vapor. Capillary pumps according to the present invention may comprise a variety of suitable vaporizer shapes and numerous geometric configurations are contemplated herein, including flat plates or disks, tubes or cylinders, and partial spheres and other curved surfaces.

In some embodiments in which high vapor outputs are desired, it may be preferred to maximize the surface area of the vapor release surface per unit volume of the vaporizer using innovative surface geometries, providing folded, corrugated, textured or otherwise convoluted vapor release surfaces. High vapor outputs may also be provided in capillary pumps having a cylindrical configuration with tubular and/or annular components. In one cylindrical embodiment, feed liquid may be provided through an internal liquid feed source with capillary pump components arranged in a generally concentric, radial configuration with the vapor release surface(s) and heat transfer component(s) near an outer periphery of the capillary pump. Alternatively, in another cylindrical embodiment, feed liquid may be provided through an external liquid feed source, with capillary pump components arranged in a generally concentric radial configuration with the vapor release surface(s) and heat transfer component(s) near one or more internal vapor passage(s).

Regardless of the geometric configuration of the capillary pump, the porous vaporizer component is preferably provided as a relatively thin layer. According to the present invention, the optimum thickness (or volume) of the vaporizer layer depends on particular application requirements and can be designed and adjusted accordingly. In practice, the vaporizer volume and surface area may be adjusted relatively independently of the vaporizer properties using various materials, treatments and manufacturing methods known to those skilled in the art. Porous vaporizer components may be produced using, for example, chemical or powder-based methods for producing bulk porous materials and thin or thick film fabrication methods, among others.

Certain properties of the vaporizer component material, such as pore size, pore size distribution, degree of porosity and thermal conductivity, contribute to determining the tradeoff between liquid permeability and capillary pressure, and represent key design considerations for high performance capillary pump devices having different capabilities and outputs. For capillary pumps in which high pressure or high velocity vapor output is important, the vaporizer component typically has relatively low thermal conductivity, small and uniform pore size, and a high degree of porosity, and is preferably composed of ceramic, metallic or composite materials.

The optimum tradeoffs for achieving the desired capillary pump performance characteristics depend upon particular application requirements, and vaporizer material properties can be designed and adjusted accordingly. Materials having higher liquid permeability generally provide higher volume throughput, and materials having higher capillary pressure generally provide higher pressure vapor output. In general, smaller pore size materials provide high capillary pressure but lower liquid permeability properties than larger pore size materials. Similarly, higher porosity materials provide higher liquid permeability but may have inadequate mechanical strength.

The equation provided below describes fundamental performance characteristics of capillary pumps of the present invention. The equation may be used to ascertain how vaporizer component material properties affect capillary pump design and performance.

$$\Delta P_v \leq \Delta P_c - \Delta P_{liquid\ drag}$$

where:

$\Delta P_v$ is the pressure increase of the evolved vapor relative to the liquid supply (i.e. vapor output pressure);

$\Delta P_c$ is the additional pressure associated with the liquid being bound to the vaporizer component by capillary force (i.e. the capillary pressure); and $\Delta P_{liquid\ drag}$ is the pressure drop associated with viscous drag forces acting on the liquid as it moves from the liquid supply to the vapor release surface.

$\Delta P_c$ increases with decreasing pore size of the vaporizer component, being limited by the largest pores (as measured by the bubble pressure). A high output, high velocity vapor output, high performance capillary pump requires a vaporizer component having generally small pores. $\Delta P_{liquid\ drag}$ decreases with increasing pore size and porosity of the vaporizer, and with decreasing vaporizer thickness. This suggests that high performance capillary pump would benefit from having a vaporizer component having generally larger pores. So, the tradeoff regarding pore size of the material comprising the vaporizer component is clear. To increase the output pressure $\Delta P_v$ (and therefore allow a higher velocity at the same orifice diameter), one needs to increase $\Delta P_c$ and reduce $\Delta P_{liquid\ drag}$.

If the pore size is reduced to increase $\Delta P_c$, then $\Delta P_{liquid\ drag}$ also increases, and the liquid permeability and maximum flow rate is greatly reduced. Thus, to maintain a high maximum flow rate, the thickness of the vaporizer component may be reduced to reduce $\Delta P_{liquid\ drag}$ and/or the vaporizer component surface area is increased. If the pore size distribution is wider (while maintaining the same bubble point), or if the porosity is reduced, then $\Delta P_{liquid\ drag}$ increases, and the liquid permeability and maximum flow rate is reduced. The design changes described above may be used to compensate. If the thermal conductivity of the vaporizer increases, which occurs when porosity decreases, then the vaporizer component thickness must be increased to maintain vaporization within the vaporizer component. This increases $\Delta P_{liquid\ drag}$, which again reduces maximum flow rate.

The vaporizer component of capillary pumps of the present invention preferably comprises a material having the unusual combination of small pore size, narrow pore size distribution (relatively uniform pore size) and high porosity. Materials having this combination of properties, and having a low thermal conductivity, are preferred for high velocity vapor output capillary pumps of the present invention. For capillary pump applications in which high maximum flow rate is not important, materials having a reduced pore size, a larger pore size distribution and reduced porosity may be used to construct the vaporizer component. These materials may be produced more economically and thus provide a lower cost capillary pump.

Capillary pumps of the present invention incorporate new systems and methods for delivering heat to the vaporizer component. In some embodiments, capillary pumps include an associated or integrated heater mechanism. For applications in which electrical power is available, an electrical heater may be used to provide the thermal energy required for vaporization. Electrical resistance heaters are preferred for many applications. For example, a heater comprising a thermistor or other suitable resistive heating material may be incorporated directly onto the surface of a capillary pump component. Alternatively, the resistive heater material(s) may be incorporated onto a substrate material having a high thermal conductivity, with the substrate material being positioned or bonded in proximity to the vapor release surface of the vaporizer during operation. Alternatively, heater components may comprise a chemically reactive substance, such as lithium bromide, that produces heat upon contact with an activator, such as water.

Capillary pumps of the present invention may optionally include a heat distribution component to more efficiently and evenly transfer heat from the heat source to the vapor release surface of the vaporizer. A heat distribution component may be provided as an integrated layer composed of a porous material having a high thermal conductivity in direct contact with or in proximity to the vaporizer.

Heat may also be applied directly to the vapor release surface of the vaporizer component using a resistive heating material in direct contact with or deposited directly onto the vaporizer component or an optional heat distribution component. The resistive heating material may be provided as a wire, a porous or perforated plate or disk, or may be deposited as a thin or thick film, and is incorporated in such a manner that the vapor permeability at the vapor release surface of the vaporizer component is substantially maintained. The resistive material itself may also be porous, allowing vapor to escape directly through the pores of the resistance heating layer. The resistive heating layer may further be incorporated into the vapor pressurization chamber, the optional heat distribution component or the orifice surface, in which case a vapor pressurization chamber surface or orifice surface may be composed of a material with generally low thermal conductivity.

Electrical and/or thermomechanical connections to an internal heater component may be made by providing electrically and/or thermally conductive feedthroughs in any of the capillary pump components. Electrically conductive feedthroughs, for example, may provide 15 electrical power to a heat source integrated with the capillary pump. Thermally conductive feedthroughs provide a thermally conductive path between a heat source and the vaporizer component. The feedthroughs may be sealed by glass, metal, ceramic adhesive, or another material to prevent escape of vapor.

Capillary pumps of the present invention optionally incorporate improved structures for the collection and controlled release of vapor. Vapor produced in or in proximity to the vaporization component may be collected internally within an integrated capillary pump structure, and then released from the capillary pump at predetermined locations and/or under predetermined conditions. In some embodiments, vapor release from the capillary pump is controllable and may be programmable.

A vapor pressurization chamber may be provided as a space, or a zone, located in proximity to the vapor release surface of the vaporizer component. Vapor collection and/or pressurization chamber(s) may comprise a series of independent and/or interconnecting passageways or channels provided in proximity to the vapor release surface of the vaporizer component that facilitate vapor collection and/or transport, thereby allowing vapor to collect internally within the capillary pump at higher pressures than the pressure of the liquid feed source. In some embodiments of capillary pumps of the present invention, a vapor pressurization chamber may be formed by surface discontinuities in the vapor release surface of the vaporizer component, or in as channels, passageways or other contiguous spaces provided in the orifice surface or optional heat distribution component in proximity to the vapor release surface of the vaporizer component.

Capillary pumps of the present invention generally have an external orifice component that is substantially impermeable to vapor, except at one or more orifice opening(s). The orifice component may have a size and shape that generally conforms to the vapor release surface of the vaporizer component, or it may be provided in a different size and shape according to application requirements. One or more orifices penetrating the orifice surface provide for the controlled release of vapor in applications in which the produced vapor is released external to the capillary pump at a velocity greater than zero. The orifice opening(s) may have a generally circular or other curved configuration. For applications requiring high velocity vapor output, the orifice(s) may also be sized and shaped to maximize vapor velocity, and may accordingly have a chamfered or venturi-shaped vertical cross-sectional profile. Suitable orifice and nozzle configurations are well known in the art. For applications in which high velocity vapor output is not required, the orifice component may contain numerous orifice openings and may be provided as a perforated or mesh-like component or may contain one or more larger and less critically shaped orifice openings.

In some embodiments, the vapor collection chamber and orifice component may be configured to promote heat transfer to and even distribution of heat to the vaporizer component. In this case, an orifice component surface positioned in proximity to the vapor release surface of the vaporization component is preferably constructed from a material that has high thermal conductivity and has a discontinuous heat transfer surface. Heat transfer surfaces that transfer heat through projections in the form of posts and/or fins that interface with the vapor release surface of the vaporizer component and also provide passageways for vapor collection and transport to the one or more orifice openings are suitable.

In some embodiments, the capillary pump additionally comprises a porous insulator component having a high liquid permeability and a low thermal conductivity in proximity to the liquid feed surface of the vaporizer component. The porous insulator component has relatively large pores and is a relatively thick component compared to the thickness of the vaporizer component. The insulator component, in some embodiments, has channels or interconnecting passageways through its thickness, or may have a bimodal or multimodal pore structure to effectively provide passages for dissolved atmospheric gases to exit the insulator component as liquid is conveyed toward the vaporizer component. A liquid feed surface of the insulator component is preferably in good liquid contact with an adjacent liquid feed surface of the vaporizer component. A feed introduction surface of the insulator component is in intimate contact with a source of the feed liquid to be vaporized. The feed introduction surface may additionally have lateral channels, texture or other contiguous spaces to transfer and ensure escape of dissolved atmospheric gasses away from the vaporization area, such as to the edge(s) of the capillary pump. These passageways may lead to one or more exit ports through which the gasses may be removed from the pump.

Additional capillary pump functionalities may be provided by modifying the characteristics of the capillary pump components, and/or by incorporating additional or different components within the capillary pump device. One example of added functionality may involve the incorporation of other gas permeable layers within the vapor pressurization chamber, for example, for the purpose of treating or reacting the vapor prior to releasing it.

One or more additional liquid permeable components may be provided within the liquid feed path to filter or otherwise pre-treat or react the liquid feed prior to vaporization. A liquid filtration component composed of a material that removes one or more undesired constituents from a liquid feed stream, and/or adds one or more desired constituents to a liquid feed stream may be provided, for example. A filtration and/or liquid feed pretreatment component may alternatively be provided in a liquid reservoir or a liquid feed system that is physically separate from the capillary pump. Alternatively, one or more liquid feed treatment components may be associated with a capillary pump and provided, for example, as a layer in proximity to the insulator component, the vaporizer component, or another capillary pump component upstream from (on the liquid feed side of) the vaporizer.

In some embodiments, a liquid feed preheat component is provided on the liquid feed side of the vaporizer to accelerate heating of the liquid feed prior to introduction to the vaporization component.

A liquid reservoir and/or liquid feed delivery system may be associated with or integrated into capillary pumps of the present invention. Suitable liquid feed reservoirs and delivery systems may have rigid or flexible walls. Since liquid is generally delivered to the capillary pump at substantially ambient pressures and temperatures, many types of reservoirs and liquid delivery systems may be used without requiring adaptation to high temperature and/or high pressure materials.

Capillary pumps may be adapted for use with a variety of applications that utilize pressurized or unpressurized vapor. For combustion applications, the pump may incorporate or be associated with an energy converter to generate a flame from pressurized vapor released from a capillary pump. Such energy converter may include, for example, spark electrodes, glow wires, flint assemblies, or the like. Liquid fuels including JP8, kerosene, diesel, gasoline, naptha, iso-octane and dodecane, other petroleum products, alcohols, including methanol, ethanol and isopropanol, aviation fuels, and the like are vaporized using improved capillary pumps of the present invention. Non-fuel liquids, including aqueous liquids and light oils, are also vaporized using improved capillary pumps of the present invention.

BRIEF DESCRIPTION OF THE DRAWINGS

FIG. 1A is a schematic side view diagram illustrating a capillary pump comprising a plurality of stacked disk layers according to one embodiment of the present invention.

FIG. 1B is a schematic side cross-sectional diagram illustrating a capillary pump comprising a plurality of stacked disk layers according to another embodiment of the present invention.

FIG. 2A a schematic illustration of an alternative capillary network microstructure having an aligned cylindrical pore structure for the material comprising a vaporization component.

FIG. 2B shows an SEM image illustrating another alternative capillary network microstructure having a reticulated foam or strut structure for the material comprising a vaporization component.

FIG. 3A is a schematic perspective diagram of another embodiment of a capillary pump of the present invention having a tubular construction with annular components.

FIG. 3B is a schematic cross-sectional view of the capillary pump of FIG. 3A.

DETAILED DESCRIPTION OF THE INVENTION

Figure 1A:
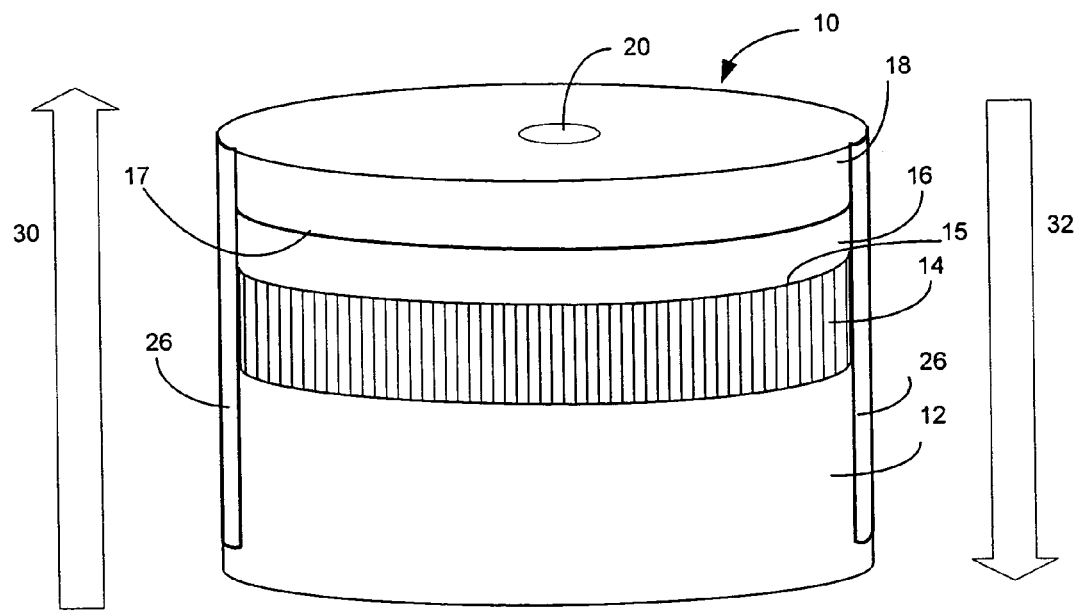

Capillary pumps producing more highly pressurized (generally higher velocity) vapor and less pressurized (generally lower velocity) vapor emissions are provided. The capillary pumps include multiple components and may be provided as an integrated, multi-layered device. The capillary pumps comprise at least three components, including a vaporization component, a heat transfer component, and a feed liquid supply interface. Capillary pumps of the present invention may, optionally, comprise one or more additional layers or components, each providing specialized functional attributes. The material properties of each layer comprising the capillary pump are important and contribute to the overall capabilities and performance of the capillary pump.

Numerous exemplary configurations of and applications for capillary pumps are described below. The component materials are described below with reference to their structures and/or properties, and with the recognition that materials having different ranges or combinations of properties may be used for particular applications. Components having common reference numerals in the accompanying figures have properties within the ranges described for similarly numbered components. Various combinations of individual components may be assembled in capillary pumps designed for use in particular applications.

An exemplary capillary pump 10 having a stacked disk configuration is shown in FIG. 1A. During operation, a liquid/vapor flow pathway is established in the direction of arrow 30, while a heat flow pathway is established in the direction of arrow 32. Capillary pump 10 comprises, in the direction of the fluid flow pathway 30, an optional liquid feed component 12 serving as the liquid feed supply interface and providing liquid feed to other components of the capillary pump, an optional insulator component 14 having a generally low thermal conductivity to prevent excessive heat transfer to liquid feed component 12 or an alternative liquid feed source, a porous vaporization component 16 in which feed liquid is converted to vapor, and an orifice component 18 having an orifice 20 releasing vapor produced in or at the surface of vaporization component 16.

Vaporization component 16 has a liquid feed surface 15 and a vapor release surface 17. Vapor release surface 17 is generally provided as a smooth surface, although channels may be provided in the vapor release surface to promote transfer of vapor to release locations. Likewise, liquid feed surface 15 of vaporization component 16 may be generally smooth, or may be provided with channels for passage of released gases to exit points at the periphery of the capillary pump. A liquid and vapor impermeable seal 26 is provided at the peripheral surface of vaporization component 16 and along at least portions of the peripheral surfaces of optional liquid feed component 12, optional insulator component 14 and orifice component 18. For illustrative purposes, only portions of seal 26 are shown in FIG. 1. Seal 26 extends along the full circumference of peripheral surfaces of vaporization component 16 and along at least portions of peripheral surfaces of associated components. During operation, the highest temperature areas are in proximity to the vapor release surface 17 and the lowest temperature areas are in proximity to liquid supply layer 12.

The constituent components of capillary pump 10 are sufficiently aligned to produce and sustain the fluid flow pathways for the liquid and vapor to travel in the capillary pump. Associated surfaces of various components are preferably in close proximity to one another and may be in contact with one another. In some embodiments, each of the component surfaces closely contacts the adjacent component surface substantially without gaps or voids. The relative thickness, or volume, of the various components depends on the function that component provides and the capillary pump application. In addition to the components illustrated in FIG. 1, additional and/or alternative components may be provided and are within the intended scope of the invention. Exemplary additional components are described below.

Optional liquid feed component 12 is composed of a highly porous capillary material having generally large pores and is capable of providing the liquid feed to an adjacent component of the capillary pump at a generally constant feed rate and temperature. Materials having an average pore diameter of from about 5 to 150µ are generally suitable for liquid feed component 12, and materials having an average pore diameter of from about 25 to 75µ may be suitable for particular applications. Exemplary porous materials that may be used for the liquid feed component 12 include porous ceramics, such as alumina grindstone material (as provided, for example, by Abrasives Unlimited Inc., San Leandro, Calif.). Other types of absorbent, porous materials including cotton, fiberglass (such as NOMEX™ from E.I. duPont de Nemours & Co., Wilmington, Del.), and the like, that are known in the art, may alternatively be used as a liquid feed component.

The dimensions and placement of liquid feed component 12 are such that liquid feed is transported across liquid feed component 12 and conveyed to the other components of capillary pump 10 regardless of the level of liquid fuel in a supply reservoir. Liquid feed component 12 is thus in liquid communication with free liquid in a reservoir or liquid conveyed to the liquid feed component by means of a liquid delivery system. Liquid feed may be provided to capillary pump 10 at generally ambient temperatures and/or pressures. In other embodiments, liquid feed may be supplied at higher or lower temperatures and/or pressures than ambient. For example, a substance that is a solid or semi-solid at ambient temperature may be supplied at a temperature above its melting point, or a liquid that is highly viscous at ambient temperature may be supplied at a temperature higher (or lower) than ambient to reduce its viscosity. A heater or preheat component may provide the heat required to convert solid materials to a liquid state in which they may be vaporized using capillary pump 10.

Optional liquid feed component 12 may be provided as an integral component of the capillary pump, as shown in FIG. 1, and is typically located within a capillary pump at a low temperature position along heat pathway 32. In alternative capillary pump embodiments that don't employ a liquid feed component, liquid feed may be delivered directly to another component of the capillary pump by direct contact with liquid feed, or by indirect contact with liquid feed, such as through a liquid delivery system.

Optional insulator component 14 is positioned between liquid feed component 12, or a liquid feed source such as a liquid reservoir or liquid delivery system, and vaporization component 16. The insulator component shields feed liquid in the supply area from heat that migrates toward the feed liquid supply from the vaporization component. Insulator component 14 generally matches the surface area and configuration of the liquid feed surface of the vaporization component and is composed of a generally low thermal conductivity, porous material having a relatively large pore size to reduce viscous drag. Materials having average pore sizes of from about 5 to 100 microns or, more typically, from about 20 to 50 microns are preferred. In general, the pore size of the insulator component is from about 10-50 times larger than the pore size of the vaporization component. Materials having a minimum air permeability of from about 0.5-50×10$^{-12}$ m$^2$ and a maximum thermal conductivity of from about 0.03 to 3 W/m-° K are preferred. Suitable materials include porous ceramic materials, such as porous zirconia and alumina, as well as silica. Porous metallic materials having a relatively low thermal conductivity, such as stainless steel and cermet materials, may also be used.

Insulator component 14 protects the liquid feed from being heated excessively prior to contacting vaporization component 16, and assists in maintaining liquid feed in a reservoir or a feed delivery system at a relatively low temperature. The thickness of insulator component 14 may depend, in particular applications, on the minimum flow rate that is desired for the pump. The rate at which temperature decreases from one end to the other end of the capillary pump may be determined by the balance of liquid flow along liquid flow path 30 and the conduction of heat along heat flow path 32. In general, the lower the rate of liquid flow upward, the greater the thickness necessary for the insulator component 14. Thus, the thickness of insulator component 14 may be partially determined by the dynamic range of fluid flow desired for the capillary pump. Insulator component 14 is generally at least twice the thickness of vaporization component 16, and may be up to 10-15 times the thickness of vaporization component 16.

Vaporization component 16 comprises a highly porous material that provides a combination of high liquid permeability and high capillary pressure. Vaporization component 16 is constructed from a material having a thermal conductivity that is low enough to prevent vaporization from occurring on a liquid feed surface of the vaporization component, but high enough to maintain a thermal gradient such that the temperature at the vapor release surface is at or higher than the vaporization temperature for the liquid feed, and the temperature at the liquid feed surface is lower than the vaporization temperature for the liquid. In general, the temperature difference between the feed liquid and the vapor release surfaces of the vaporization component is at least about 10° C.

Vaporization component 16 is preferably constructed from a porous material having a generally uniform, small pore size and a high degree of porosity (i.e. void fraction). In one embodiment, the vaporization component has average pore sizes of less than about 10µ and a porosity of >50%. In another embodiment, the vaporization component has average pore sizes of less than about 5µ and a porosity of >50%. In yet another embodiment, the vaporization component has an average pore size of about 1µ or less and a porosity of >70%. Because the liquid permeability increases with increasing pore size, and the capillary pressure decreases with increasing pore size, there are trade-offs in selecting material properties, and different pore sizes may be suitable for use with different types of liquid feeds. Similarly, thermal conductance of the vaporizer layer may be reduced, and at the same time the liquid permeability may be increased by increasing the porosity of the vaporization layer.

In one embodiment, the pores of vaporization component 16 are substantially uniform in size and structure and provide small open structures, or capillary networks, facilitating fluid flow. The pore size of vaporization layer 16 is sufficiently small to provide adequate capillary pressure to produce the desired vapor output rate and pressure. For example, an average pore size may be in a range from less than about 0.01µ to about 50µ, preferably from about 0.05 to 10µ, and more preferably from about 0.10 to 2.0µ. The pore size may be smaller where it is desirable to generate greater capillary pressures and, consequently, higher evolved vapor pressures. The pore size and material structure of vaporization component 16 preferably remains substantially constant during operation of the capillary pump. The vaporization layer also has a desired degree of porosity (i.e., void volume) to produce the desired volume of vapor and rate of vaporization. Degrees of porosity in the range of from about 45% to 90% are suitable, and porosities of from about 60% to 80% being generally preferred.

Vaporization component 16 preferably comprises a material having a minimum bubble pressure of from about 5-15 psi, measured as the lowest pressure providing a steady flow of bubbles using isopropyl alcohol and a minimum air permeability of from about 0.3 to $3\times10^{-12}$ m$^2$. The material comprising vaporization component 16 is a generally low thermal conductivity material capable of maintaining a thermal gradient along the liquid flow pathway in the vaporization component and preventing substantial heat loss from the component. Materials having a thermal conductivity of less than about 10 W/m-° K are suitable for vaporization component 16, and materials having a maximum thermal conductivity of about 1.5 W/m-° K are preferred for many applications.

Suitable materials for vaporization component 16 having the properties described above include porous ceramic materials, as well as porous metallic or cermet materials. Porous alumina and zirconia materials, including unstabilized zirconia that becomes stable during processing, stabilized zirconia (PSZ), tetragonal zirconia (TTZ), and zirconia ceramics stabilized with yttria, magnesia, ceria or calcia, or a combination of stabilizing materials, and other ceramics having low thermal conductivity, are preferred for many applications. Alternative vaporization component materials include fibrous materials such as fiberglass mats, and other types of woven and non-woven fibrous or porous materials.

Materials and methods such as those described in U.S. Pat. Nos. 6,585,509B2 and 6,634,864B2, which are incorporated herein by reference in their entireties, for producing the capillary member are suitable for use in producing vaporization component 16 of capillary pumps of the present invention. Vaporization components of this type have a randomly porous capillary network structure, as illustrated in the electron micrograph shown in FIG. 2 of U.S. Pat. No. 6,585,509B2, in which the capillary network is formed as the interstices between particles. These materials and fabrication techniques provide porous materials having a high overall porosity and tortuous porous pathways.

Figure 2A:
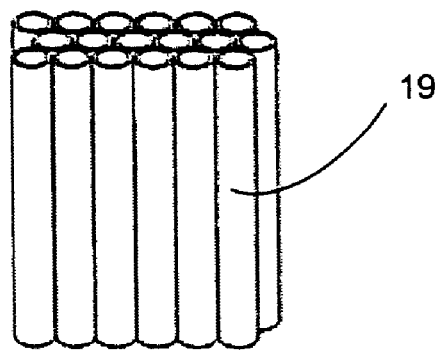

FIG. 2A illustrates an alternative pore structure for the material of vaporization component 16 having suitable capillary network and thermal conductivity properties, and comprising a regular structure of aligned pores. The aligned pores forming the capillary network may be formed as a plurality of associated and aligned cylindrical structures 19, e.g. columns, along with the spaces between aligned structures 19. The columns may be positioned at least substantially parallel to each other. Ceramic materials, such as alumina and zirconia, etched metallic or cermet materials, and silicon materials having the desired three dimensional properties are suitable for construction of vaporization components of the present invention. Vaporization components having this structure minimize the liquid drag and provide generally higher liquid flow throughput and higher vapor output.

Figure 2B:
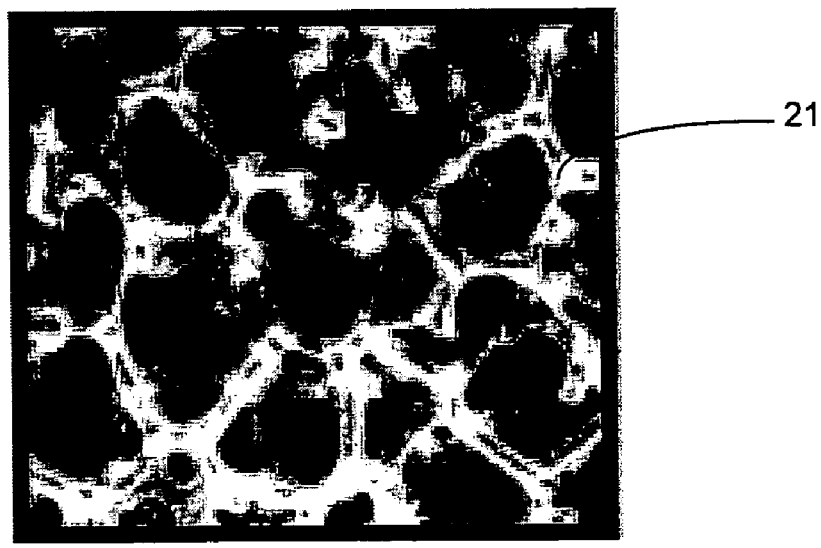

FIG. 2B illustrates another alternative pore structure for the material of vaporization component 16 having suitable capillary network and thermal conductivity properties, but comprising a regular or irregular lattice or reticulated foam structure. In this embodiment, a plurality of struts 21 forms a generally rigid framework for the porous material and provides an interconnected capillary network of structural elements. This structure also provides a high total porosity and reduces the liquid drag to provide generally higher liquid flow rates and higher vapor output. Ceramic materials such as alumina and zirconia having a reticulated foam structure may be employed.

The highly porous material comprising vaporization component 16 may be friable, particularly when vaporization component 16 is provided as a thin layer. A rigid mechanical support may be incorporated in certain embodiments of capillary pumps of the present invention as a vaporization layer support. Materials such as alumina grindstone are suitable for use as mechanical supporting layers. A mechanical supporting structure may be provided as a thin layer adjacent the liquid feed surface of vaporization component 16. In capillary pumps employing an insulator component, the insulator may serve as a mechanical support for the vaporizer component.

In one embodiment, the vaporization and insulator components may be provided as a single porous component having a graded pore size distribution. In such a material, a smaller pore size distribution is provided in the vaporization region, while a larger pore size distribution is provided in an insulator region. The insulator region may also serve as a mechanical supporting structure for the vaporization region. Suitable porous components having a graded pore size may be provided, for example, using vapor-phase sintering of a porous ceramic material under conditions of a thermal gradient.

In some embodiments, the vaporization component 16 used in capillary pumps of the present invention is relatively thin in comparison with the other components of the capillary pump. When an insulator component is employed, for example, the insulator component generally has a thickness, or volume, of about 1.5-15 times that of the vaporization component. For small scale applications, suitable thicknesses for the vaporization component are generally between about 0.01 and 10 mm; more typically between about 0.10 and 3.0 mm; and most often between about 0.20 and 2.0 mm. Suitable surface areas may vary depending on particular applications and configurations, and various sizes, such as between about 0.01 and 100 square centimeters, more typically between about 0.10 and 25 square centimeters, and most often between about 0.25 and 10 square centimeters. Capillary pumps having diameters of 5 mm, 13 mm and 19 mm have been tested and demonstrated to perform well, as described below.

The vaporization of liquid feed occurs at least substantially at a vaporization region within vaporization component 16, where the temperature is at the vaporization temperature for the liquid. The vaporization region may be along a vapor release surface of vaporization component 16 that is farthest away from the liquid supply along the fluid flow pathway. Alternatively or additionally, the vaporization region may be located at other zones within vaporization component 16. The location of the vaporization region generally equilibrates and remains substantially constant during operation of the pump.

The peripheral surface of at least the vaporization region within vaporization component 16 is sealed with a material that is substantially fluid (liquid and gas) impermeable. In most embodiments, peripheral seal 26 is provided along the entire peripheral surface of vaporization component 16 and extends along at least a portion of the peripheral surfaces of associated capillary pump components. The sealing material may comprise a generally low thermal conductivity material, such as glass, that seals the peripheral surface of vaporization component 16 and may additionally extend over peripheral surface(s) of other capillary pump component(s) and hold the various pump components in alignment. According to another embodiment, the fluid impermeable seal may be provided as low thermal conductivity shroud, comprising a stainless steel, a titanium alloy, or the like. The thermal conductivity of the sealing material is generally less than about 2 W/m-° K and preferably less than about 1 W/m-° K.

During operation of a capillary pump, heat is provided or applied to a heat transfer component and conveyed to the vaporization component. Heat may be applied from an external source or a controllable heating component may be associated with or integrated in capillary pumps of the present invention. The heat transfer component has a high thermal conductivity and may incorporate a heater that is integrated with the capillary pump, or may comprise one or more thermally conductive elements that deliver thermal energy to the vaporization component of the capillary pump. In the embodiment illustrated in FIG. 1, orifice component 18 serves as the heat transfer component as well as the vapor release component. The primary function of the vapor release component is to provide controlled release of vapor generated in the vaporization layer to an area outside the capillary pump. The heat transfer and vapor release components may be provided as separate components, or they may be integrated and provided in a unitary device.

The configuration of the heat transfer component generally matches the configuration of the vapor release surface of the vaporization component, and the heat transfer component is closely associated with and in close proximity to the vapor release surface of the vaporization component. In some embodiments, at least portions of an interface surface of the heat transfer component contact(s) the vapor release surface of the vaporization component. In general, this arrangement provides the most efficient heat transfer.

The material forming the heat transfer component generally has high thermal conductivity and is substantially impermeable to vapor, except at orifice(s) or openings. The thermal conductivity of heat transfer component 18, for example, is preferably greater than 1.5 W/m-° K, and may be greater than 5 W/m-° K. Various materials may be used to provide the thermal conductivity desired, and various applications and liquid feed materials may require different thermal conductivity properties. In some embodiments, the heat transfer component may be composed of a material that has relatively high electrical conductivity. Substantially non-porous ceramic materials such as non-porous alumina are suitable, as are non-porous metals, silicon carbide, silica, and cermet materials.

One or more orifice(s) 20 are of a sufficient size to permit egress of one or more vapor stream(s). In some embodiments, the orifice(s) may be fixed in size. In one embodiment, the orifice(s) have a larger diameter portion in proximity to the vapor release surface of the vaporization component that tapers to form a smaller diameter portion from which the vapor is released. Such a tapered opening may assist in efficiently forming a jet of vapor. Similarly, the opening may be in the form of a venturi to promote efficient ejection of pressurized vapor.

Depending on the structure of the vapor release component, the produced vapor may be released at high velocity as a vapor jet, or at low or nearly zero velocity. In some embodiments, the vapor release component is provided as a substantially vapor impermeable member having one or more vapor permeable openings to release a vapor stream at a velocity. For applications where a relatively high velocity vapor stream is desired, the vapor permeable opening(s) are relatively few and relatively small to provide vapor collection and pressurization prior to release. For applications in which a relatively low velocity vapor stream is desired, more and/or larger vapor permeable openings are provided. In some embodiments, for example, the vapor release component may be provided as a perforated or mesh-like structure that provides for the release of vapor from multiple openings, such that the vapor released is not significantly accelerated.

In alternative embodiments, the size of the orifice(s) may be adjustable to provide variable vapor output depending on the dynamic range of flow desired from the pump. In one embodiment, one or more variable opening(s) may be provided as radially-slotted opening(s) in a flexible plate. The opening(s) have one or more slots such that a large opening may be provided at high flow rates, and the opening may be adjusted to provide a smaller opening when the flexible plate is relaxed at low flow rates. The opening(s) expand(s) as vapor flow increases as vapor presses against the opening edges and the plate flexes outwards, thus increasing the effective area of the opening. This expanded opening may reduce the internal vapor pressure at high flows and increase the dynamic range of flow. In another embodiment, one or more opening(s) of equal or different sizes are provided and at least partially covered by a moveable plate. The plate may be controllably moved, such as by mechanical or electronic means, in a release direction to uncover more of the area of the opening(s) as flow increases and in a closed direction to cover more of the area to reduce flow. In one embodiment, the plate and/or opening may be of an irregular shape to improve flow control.

Figure 1B:
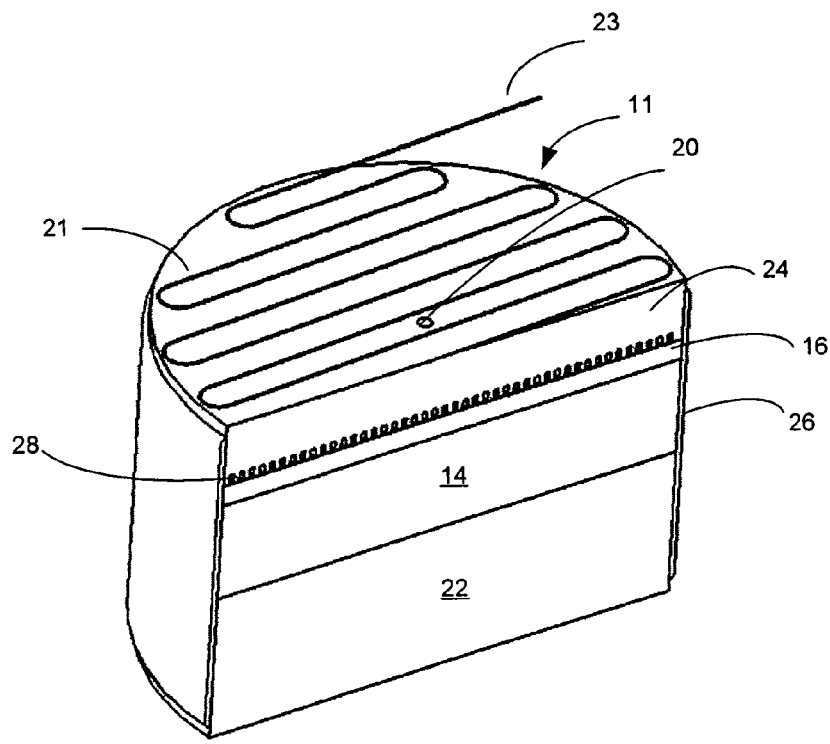

FIG. 1B illustrates another exemplary capillary pump 11 having a stacked disk configuration. Capillary pump 11 comprises, in the direction of the fluid flow pathway (30), an optional feed treatment component 22, insulator component 14, vaporization component 16, orifice component 24 having an orifice 20 releasing vapor produced in or at the surface of vaporization component 16, heater element 21 provided on a surface of orifice component 24, and electrically conductive lead providing a connection to an electrical power source.

Optional liquid pretreatment component 22 may be integrated in capillary pumps of the present invention and provided as a porous element positioned between a liquid feed source and an insulator component, as shown in FIG. 1B. In this embodiment, liquid pretreatment component 22 serves as the feed liquid supply interface. Alternatively, a liquid filtration or pretreatment component may be provided in association with a liquid reservoir, or in a liquid feed delivery system. Pretreatment of liquid fuels, for example, with activated carbon, diatomaceous earth, silica, zeolites, and other materials removes many contaminants from the liquid fuel that would otherwise be deposited in various layers of the capillary pump. A liquid filter or pretreatment component may also incorporate additives such as anti-oxidants that inhibit the synthesis of low volatility components during storage of the liquid feed, or during vaporization of the liquid feed in the capillary pump.

Heater element 21, such as a resistive heating element, may be provided and electrically connected to a power source (not shown). A thick-film heater may be integrated with the heat transfer component, for example, by printing an electrically conductive element 21 directly onto a surface of a heat transfer component. In the embodiment illustrated in FIG. 1B, heater element 21 is provided on an external surface of orifice component 24. A heater element may alternatively be provided on an internal surface of the heat transfer component, or on an internal surface of an orifice component, in proximity to the vapor release surface of the vaporization component. Electrical lead 23 may be provided as an extension of heater element 21, as shown, for connection to an external power source, or alternative electrical connection structures may contact the heat transfer component and terminate in a location that is convenient for connection to an external power source.

Orifice component 24, providing both the heat transfer and vapor release functions of the capillary pump illustrated in FIG. 1B, is provided with a plurality of channels 28 on its internal surface in proximity to the vapor release surface of vaporization component 16 to promote collection of vapor and conduction of the vapor released to orifice 20. Channels 28 may be formed by a series of projecting posts, or fins, or other projections, and several embodiments of projections forming channels are illustrated schematically in FIGS. 6A-6C. Projections forming channels 28 are in close proximity to the vapor release surface of vaporization component 16 and, in one embodiment, contact the vapor release surface of vaporization component 16.

Figure 3A:
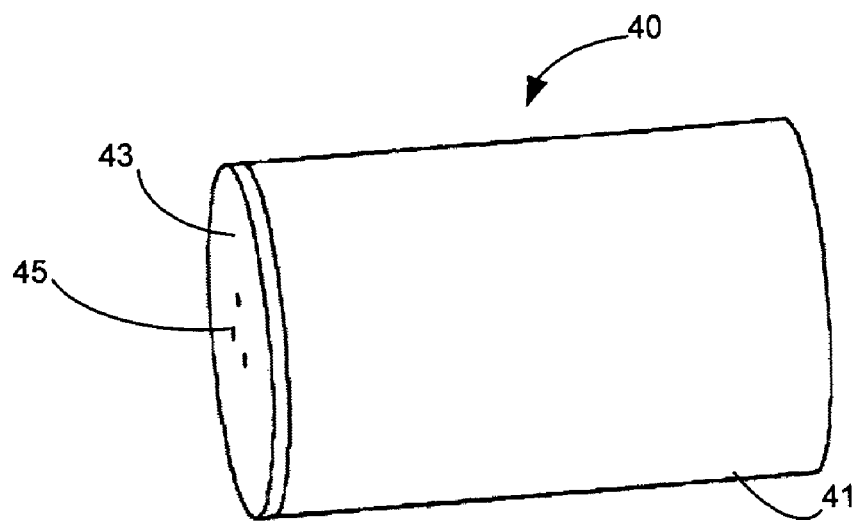
Figure 3B:
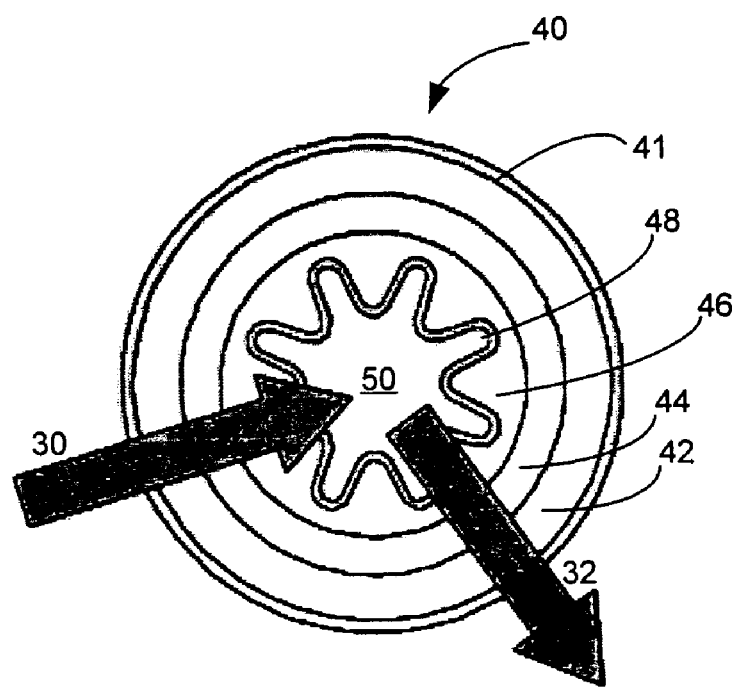

FIGS. 3A and 3B illustrate an alternative configuration of capillary pump 40 of the present invention having a tubular configuration in which feed liquid is delivered to an external surface of the capillary pump and vapor is released at an internal cavity of the capillary pump. In this embodiment, liquid feed chamber 42 having a liquid permeable outer wall 41 is provided as a generally annular chamber in communication with a liquid feed source. A porous, generally annular insulator component 44 serves as the feed liquid supply interface and is provided between liquid feed chamber 42 and vaporization component 46. In this embodiment, heater component 48 is provided in association with and/or in proximity to the vapor release surface of vaporization component 46. Heater component 48 and the vapor release surface of vaporization component 46 may have an annular, cylindrical configuration or may be provided as a convoluted surface, as shown in FIG. 3B, to increase the heater and vaporization release surface area. Vapor collection chamber 50 is provided at a central "core" of the capillary pump. Vapor may be controllably, and/or programmably released at selected withdrawal ports 45 in communication with vapor collection chamber 50. At least one end of capillary pump 40 may be substantially sealed at end cap 43, permitting vapor release through ports 45. The other end of capillary pump 40 may also be sealed using an end cap, permitting liquid flow into liquid feed chamber 42.

Figure 4A:
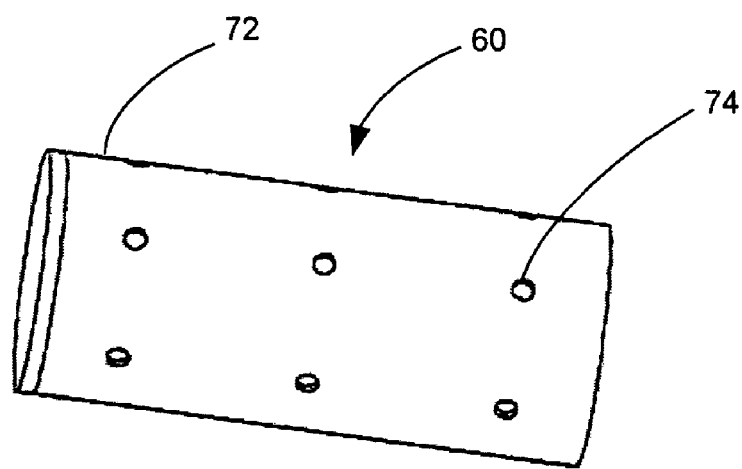
FIG. 4A is a schematic perspective diagram of another embodiment of a capillary pump of the present invention having a tubular construction with annular components.
Figure 4B:
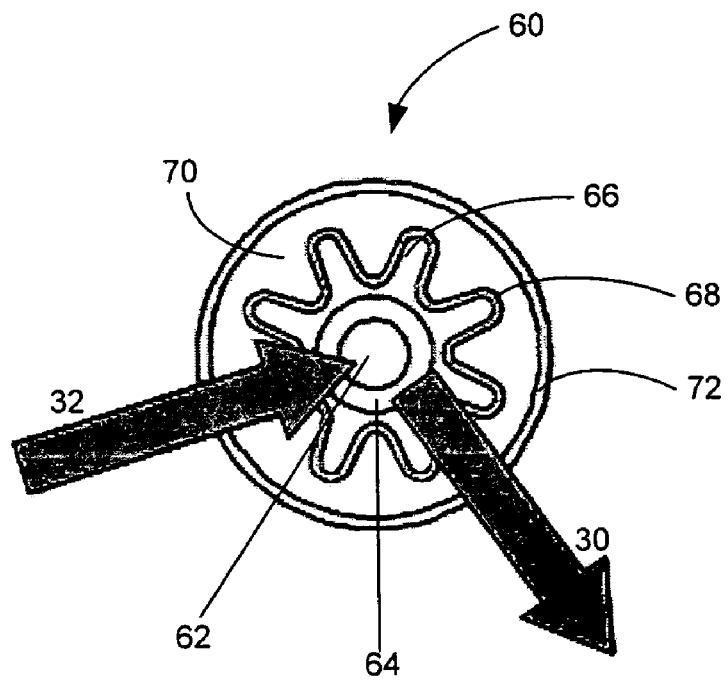
FIG. 4B is a schematic cross-sectional view of the capillary pump of FIG. 4A.

FIGS. 4A and 4B illustrate yet another configuration of a capillary pump 60 having a tubular configuration in which feed liquid is delivered to an internal surface of the capillary pump and vapor is released at an external surface of the capillary pump. In this exemplary embodiment, liquid is delivered through internal liquid feed chamber 62. The walls of liquid feed chamber 62 may be generally cylindrical, as shown, or they may be provided in a convoluted configuration to increase the surface area for liquid feed. Liquid contacts a feed liquid supply interface of porous insulator component 64, which is in contact with porous vaporization component 66. A vapor release surface of vaporization component 66 may be provided as a generally cylindrical surface, or the surface may be convoluted to increase its surface area, as shown in FIG. 4B. Heater 68 may also be provided as a generally cylindrical surface, or a convoluted surface and preferably matches the configuration of the vapor release surface. Vapor collection chamber 70 is formed external to the heater and vapor release surface and may be defined by vapor impermeable external wall 72. Vapor may be controllably, and/or programmably released at selected withdrawal ports in communication with vapor collection chamber 70. Vapor withdrawal ports may be provided, for example, as orifices 74 in external wall 72.

An integrated heater component is provided in the capillary pump embodiments of FIGS. 3 and 4 and may be provided in stacked disk and other configurations of capillary pumps of the present invention. In one embodiment, an externally powered heat source, such as a resistive heating element, may be provided and electrically connected to a power source. A thick-film heater may be integrated with the heat transfer component, for example, by printing an electrically conductive element directly onto one of the surfaces of the heat transfer component. The electrically conductive element is generally provided on an internal surface of the heat transfer component in proximity to the vapor release surface of the vaporization component. Electrical connection pads may contact the heat transfer component and terminate in a location that is convenient for connection to an external power source. The electrical connection may be made using a variety of connectors that are well known in the art.

In one embodiment, an electrical heater is constructed from a thin alumina substrate having a thick film layer of thermistor material applied to the substrate. The thermistor layer may comprise, for example, a serpentine or spiral path covering a circular area that is the same diameter as the vapor release surface of the vaporization component of the capillary pump. Electrical connections may be made using contact pads, and the traces may be electrically insulated by deposition of a glass or another non-conductive layer. The use of a thermistor material permits the measurement of heater temperature by measurement of the electrical resistance. In another embodiment, a heating trace comprising a non-thermistor material may be deposited on the heater substrate and used, in combination with a separate thermistor heater trace, providing separate mechanisms for temperature measurement and electrical power delivery.

In yet other embodiments, heat may be applied directly to the vapor release surface of the vaporizer component by a resistive material deposited in proximity to or in direct contact with the surface of the vaporizer component. The resistive material may be applied as a thin or thick film, and deposited in such a manner that the porosity of the vaporizer is substantially maintained, and vapor is released through the pores of the heater layer. A resistive heating layer may also be deposited on a surface of a heat transfer component, such as an orifice disk, positioned in proximity to the vaporization component.

In alternative embodiments, a catalyst material may be incorporated in one or more components of the capillary pump to provide a portion or all of the heat required for vaporization. In this embodiment the rate of flow may be controlled by the rate of supply of the liquid rather than the amount of externally supplied heat.

Figure 5:
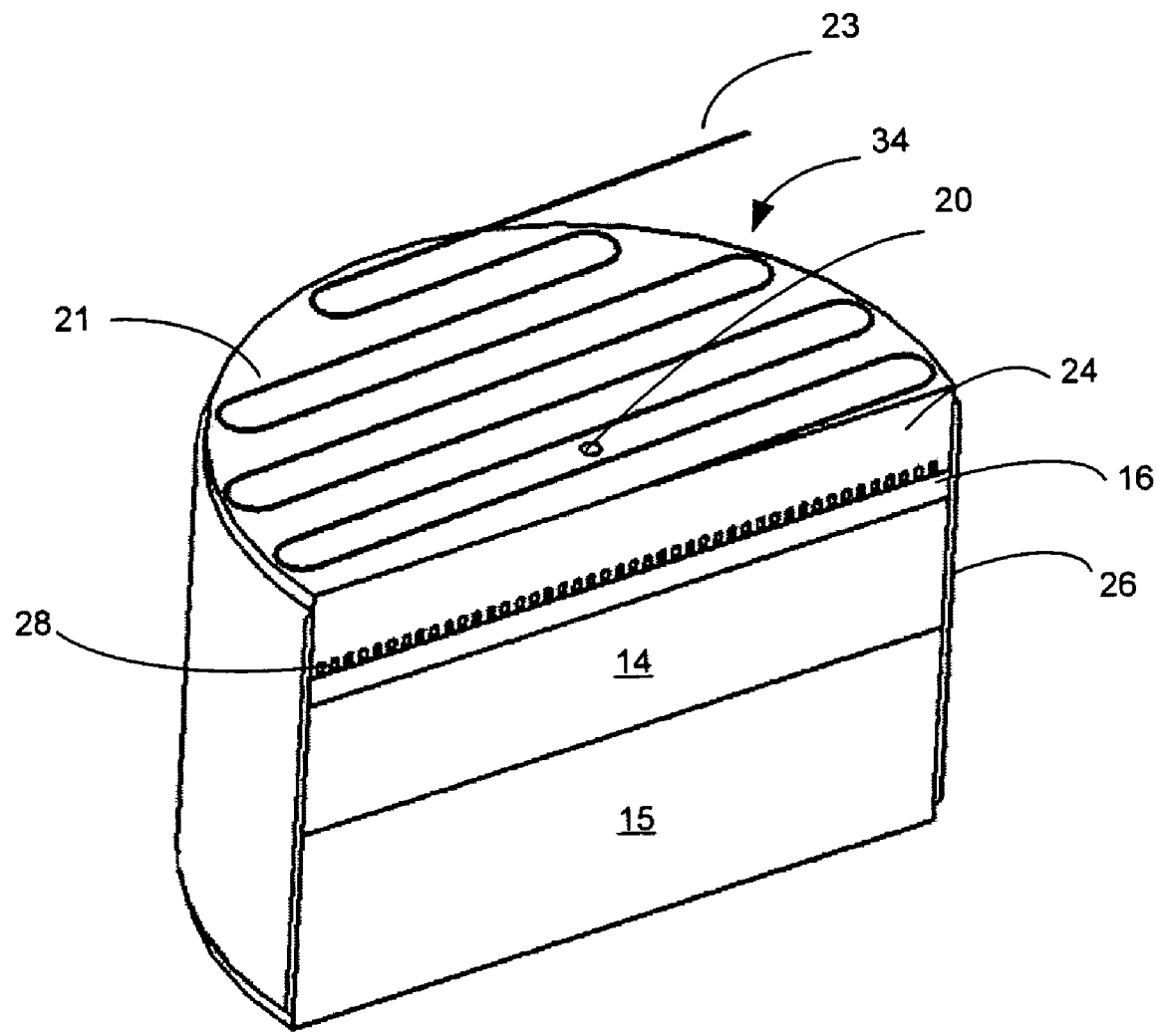
FIG. 5 is a schematic cross-sectional diagram of another embodiment of a capillary pump of the present invention incorporating a porous preheat layer.

FIG. 5 shows another embodiment of a capillary pump 34 of the present invention having a stacked disk configuration and including an orifice plate having internal channels forming a vapor collection space and a liquid pre-heat component. In this embodiment, capillary pump 34 comprises, in the direction of the fluid flow pathway 30, an optional liquid pre-heat component 15, an optional insulator component 14, vaporization component 16 and orifice component 24 having a plurality of channels 28 provided in its internal surface and an orifice 20 penetrating the orifice component. Channels 28 provide vapor collection spaces for vapor produced in and/or at the vapor release surface of vaporization component 16. Peripheral seal 26 is substantially liquid and vapor impermeable and extends over the peripheral surface of vaporization component 16 and portions of insulator component 14 and orifice component 24.

Porous liquid preheat component 15 increases the temperature of the feed liquid prior to its introduction to the vaporization layer and serves as a feed liquid supply interface. Liquid preheated in a preheat component generally has less viscous drag within the vaporization layer, providing higher liquid throughput and higher vapor output. A preheat component may be provided in addition to an insulator component, as shown, or in combination with a vaporization component and without an insulator component. The porous preheat component has generally large pores and is highly thermally conductive. The thickness of the preheat component, as well as the material comprising the preheat component, may be chosen to create a high temperature, e.g. near the boiling point, in the liquid by the time the liquid contacts the vaporization component.

Heat may be provided to the preheat layer using any of the heater systems described above with reference to heater components. Heat may be delivered to preheat component 15, for example, using thermally and/or electrically conductive leads (not shown). Preheat component 15 may be composed of an electrically resistive material, for example, and electrical power may be applied to the preheat component to preheat the liquid feed.

Orifice component 24, providing both the heat transfer and vapor release functions of the capillary pump illustrated in FIG. 5, is provided with a plurality of channels 28 on its internal surface in proximity to the vapor release surface of vaporization component 16 to promote collection of vapor and conduction of the vapor released to orifice 20. Channels 28 may be formed by a series of projecting posts, or fins, or other projections, and several embodiments of projections forming channels are illustrated schematically in FIGS. 6A-6C.

Figure 6A:
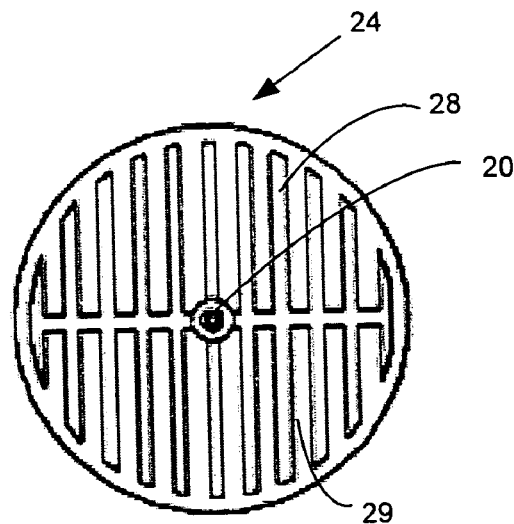
FIG. 6A is a schematic bottom view diagram of a heat transfer or vapor release orifice component having vapor collection channels formed by projecting fins.
Figure 6B:
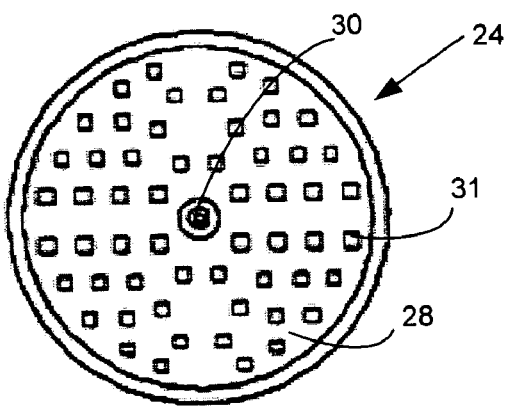
FIG. 6B is a schematic bottom view diagram of a heat transfer or vapor release orifice component having vapor collection channels formed by projecting posts.
Figure 6C:
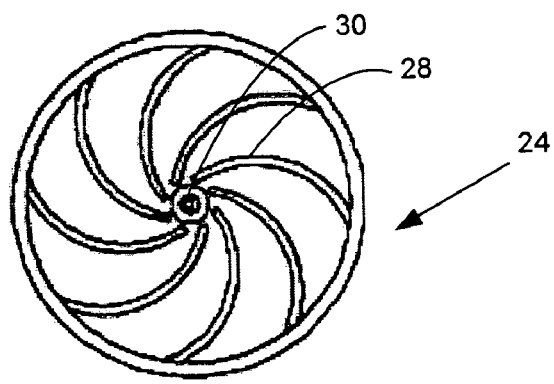
FIG. 6C is a schematic bottom view diagram of a heat transfer or vapor release orifice component having vapor collection channels formed as curved spirals.

In FIG. 6A, vapor collection and transfer channels 28 are formed between projecting fins 29. In the embodiment illustrated, a series of lateral channels is formed between a series of laterally projecting fins, and each of the laterally projecting channels is bisected by a transverse channel that intersects central orifice 20. In FIG. 6B, vapor collection and transfer channels are formed as spaces between projecting posts 31. In FIG. 6C, vapor collection and transfer channels 28 are formed as curved channels having a radial, generally spiral configuration. Vapor collection and transfer channels 28 may have a constant or variable depth and may, though need not, terminate in proximity to one or more orifice(s) 20. Vapor collection channels may be formed using machining, chemical milling, and other techniques.

In some capillary pumps of the present invention, an optional heat distribution component is provided as a separate component and mounted between a vapor release location and the vapor release surface of the vaporization component. The heat distribution component is preferably in good thermal communication with, and in many embodiments, may contact the vapor release surface of the vaporization component. The heat distribution component generally comprises a porous material such as alumina or stainless steel, having a high thermal conductivity and an average pore size large enough to provide high vapor permeability. Thermally conductive materials having average pore sizes between about 10µ and 150µ are generally suitable, and conductive materials having average pore sizes between about 30µ and 100µ are preferred for many applications.

Lateral vapor permeability within the heat distribution component increases as the thickness of the heat distribution component increases, but thermal conductance generally declines with increasing thickness of a heat distribution component. Different end-use applications for capillary pumps may dictate the use of heat distribution components having various thicknesses. In some embodiments, the surface of the heat distribution component that is in thermal communication with the vaporization component or the vapor release component may be provided with channels using a fin and/or post design, as described above with reference to an interface surface of the heat transfer component.

Figure 7:
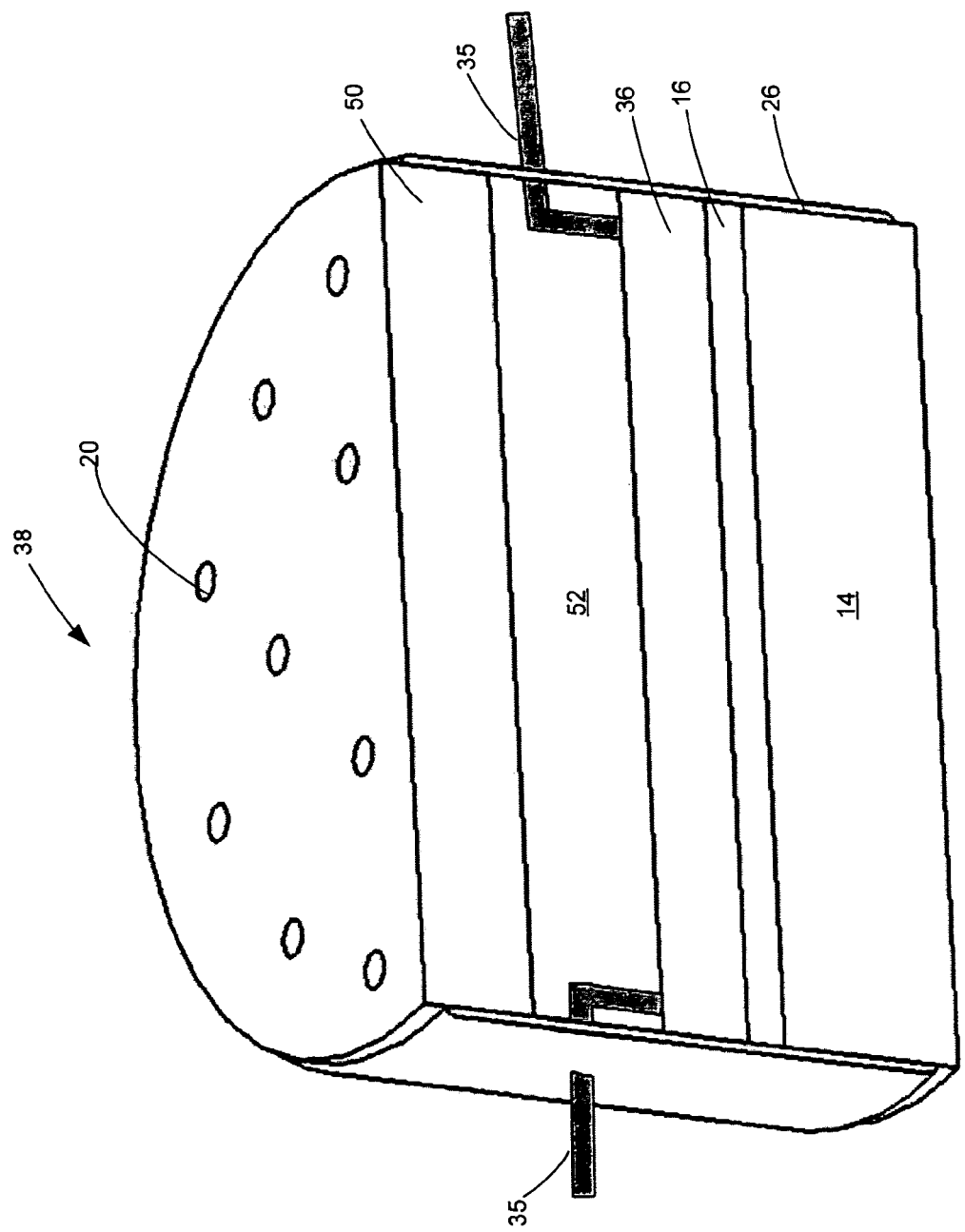
FIG. 7 is a schematic cross-sectional view of a capillary pump of the present invention having an integrated internal heater component and vapor collection chamber.

FIG. 7 illustrates another embodiment of a capillary pump 38 comprising, in the direction of the fluid flow pathway 30, insulator component 14, vaporization component 16, heater component 36 in communication with thermally and/or electrically conductive leads 35 associated with or provided in proximity to the vapor release surface of vaporization component 16, vapor collection chamber 52, and orifice plate 50 having a plurality of orifices 20.

Orifices 20 penetrate orifice plate 50 and provide a vapor release path for produced vapor collected in vapor collection chamber 52. Liquid and vapor impermeable seal 26 is provided along substantially the entire periphery of capillary pump 38. Capillary pump 38 is suitable for applications requiring low velocity vapor output, such as fragrance applications.

Figure 8A:
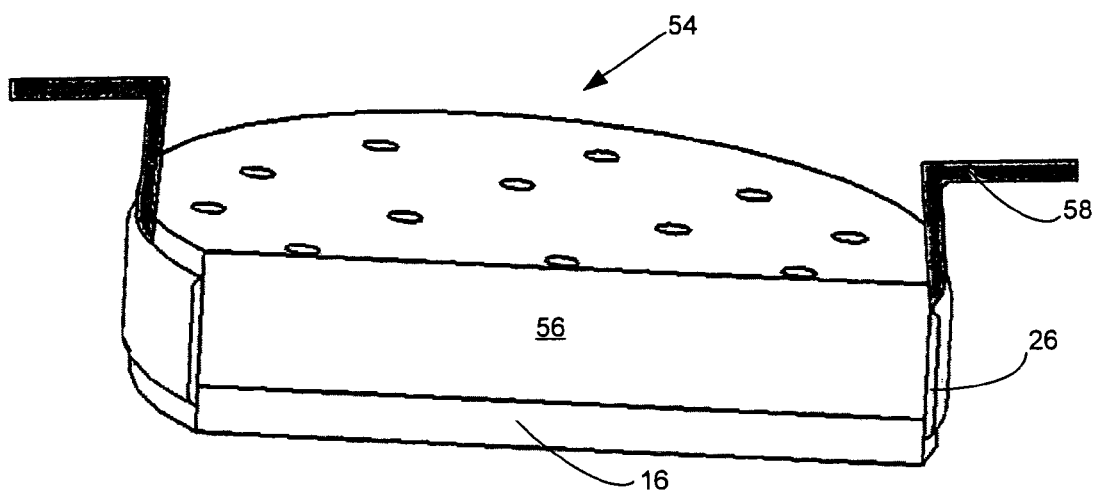
FIG. 8A is a schematic cross-sectional diagram of a simplified capillary pump having thermally and/or electrically conductive leads in communication with a heat transfer component.

FIG. 8A illustrates a simplified capillary pump 54 of the present invention having a stacked disk configuration and including a vaporizer component 16, an integrated heat transfer/vapor release component 56, peripheral seal 26 and thermally and/or electrically conductive leads 58. In this embodiment, the feed liquid supply interface is provided at a liquid feed surface of vaporizer component 16. In applications in which heat transfer/vapor release component 56 comprises an integrated heater, as described above, conductive leads are preferably electrically conductive to provide communication to the heater power source. In applications in which heat transfer/vapor release component 56 is heated by thermal transfer of heat from another source, such as an external heat source, leads 58 are preferably thermally conductive to provide a heat transfer pathway from the external heat source to heat transfer/vapor release component 56.

Figure 8B:
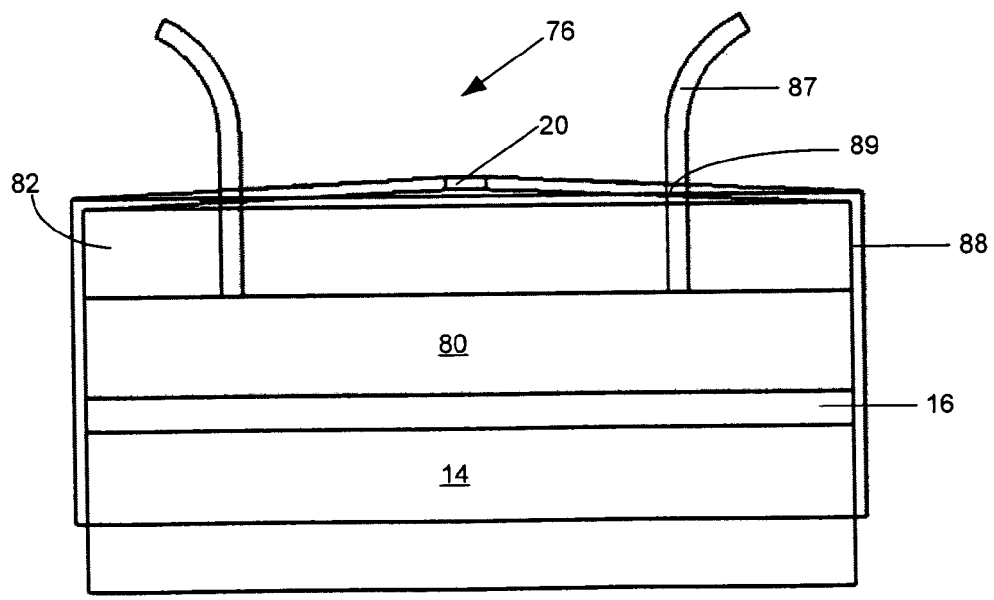
FIG. 8B is a schematic cross-sectional diagram of a capillary pump of the present invention having an integrated orifice plate and peripheral seal, and having thermally and/or electrically conductive leads in communication with an integrated internal heater component.

FIG. 8B illustrates another capillary pump 76 of the present invention having a stacked disk configuration and including an insulator component 14, a vaporization component 16, an internal heater component 80, a vapor collection and pressurization space 82, an orifice 20 provided in an orifice component 88, and conductive leads 87 providing an electrical and/or thermal path between an external heat or electrical source and internal heater component 80. Conductive leads 87 are preferably sealed using hermetic seals 89 where they traverse orifice component 88 to prevent ingress or egress of vapor except at orifice 20. Suitable hermetical sealing systems are well known in the art.

Orifice component 88, in this embodiment, is substantially fluid impermeable and may be integrated with a peripheral seal, or extend over the peripheral surfaces of other capillary components to provide an integrated vapor release structure and peripheral seal over at least the peripheral surface of vaporization component 16. The thickness of orifice component 88 may be variable, and walls of orifice component 88 in proximity to vaporization zone 16 may be thinner, for example, than walls of orifice component 88 in proximity to vapor collection and pressurization space 82 or orifice(s) 20. Porous internal heater component 80 may comprise any of the heater structures described herein, including a porous, perforated or mesh-like structure providing low resistance to the flow of vapor produced in vaporization component 16.

Figure 9:
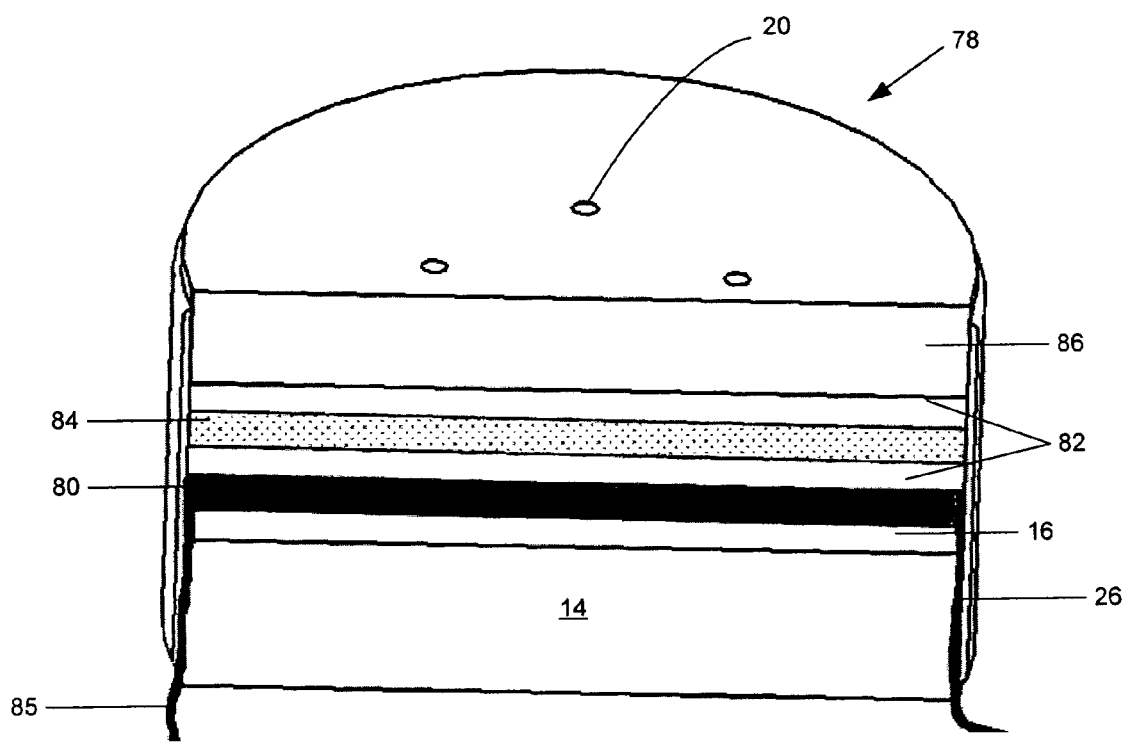
FIG. 9 is a schematic cross-sectional diagram of a capillary pump of the present invention having an integrated internal heater component and a vapor treatment element positioned in a vapor collection chamber.

FIG. 9 illustrates yet another capillary pump 78 of the present invention. Capillary pump 78 comprises, in the direction of fluid flow 30, insulator component 14, vaporization component 16, heater component 80 having thermally and/or electrically conductive leads 85, vapor collection chamber(s) 82, vapor treatment element 84, and orifice plate 86 having one or more orifice(s) 20. In this embodiment, vapor released from vaporization component 16 in vapor collection chamber 82 is contacted by vapor treatment element 84, which may remove constituents from, add constituents to, or react chemically with the vapor prior to release. One exemplary vapor treatment involves catalytic reaction of the vapor with a catalyst material deposited onto the internal surfaces of the vapor treatment element. Another exemplary vapor treatment involves the injection of a second reactive vapor species into the capillary pump from an external source at a location in proximity to the vapor treatment element for the purposes of enhancing a desired chemical reaction, such as reforming a hydrocarbon fuel.

The liquid feed being vaporized may contain small amounts of dissolved gases that are released, as gases, upon heating of the liquid within the capillary pump. These gases may reduce the efficiency of desired vapor production in the capillary pump. In one embodiment, larger pores or channels may be provided in the vaporizer and/or insulator and/or preheat component(s) to permit the escape or withdrawal of such dissolved gases without substantially reducing the efficiency or output of vapor production in the capillary pump.

Figure 10:
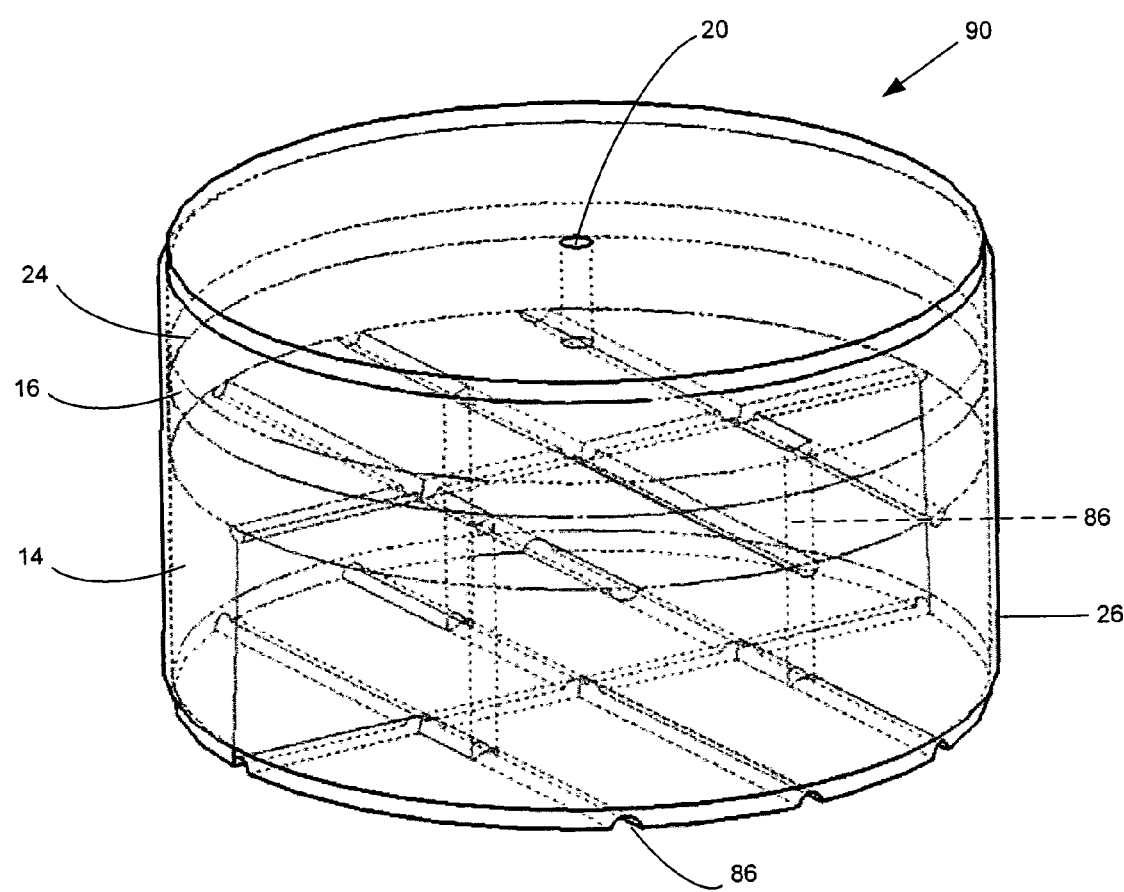
FIG. 10 is a schematic diagram of a capillary pump of the present invention illustrating internal components in broken lines and showing internal vapor escape channels provided in an insulator component.

FIG. 10 illustrates a capillary pump 90 comprising an insulator component 14, vaporization component 16 and heat transfer/vapor release component 24 provided with a central orifice 20. The internal structure of insulator component 14 is illustrated in dashed lines. Vapor escape channels 86 may be provided as lateral or transverse or angled channels, and may interconnect with other channels. The vapor escape channels may be provided as passages drilled or otherwise provided in the insulator component, or they may be provided as a result of a bi- or multi-modal pore size distribution in the material comprising the insulation component. The channels may terminate at the surface of the insulation component in contact with the liquid feed source, or, preferably at a surface that is not in contact with the liquid feed, such as a surface at the periphery of the insulation component. The vapor escape channel(s) may have a generally uniform or non-uniform diameter, and they may be direct or tortuous.

Vapor escape channels 86 preferably communicate with an unsealed surface of insulator component 14, permitting the escape of dissolved gases directly to the environment. Vapor escape channels may additionally or alternatively be provided in vaporization component 16, or in another capillary pump component provided on the liquid feed side of vaporization component 16, such as a pretreatment component, a preheat component, or the like. In some embodiments, the surface of the insulation component or another component in contact with the liquid feed source is provided as a rough surface providing passages for escape of dissolved gases, or may be provided with channels terminating at the periphery of the relevant component to provide for effective egress of dissolved gases released in the capillary pump.

The surfaces of capillary pump components, including the internal porous surface areas and/or channels, may be treated with various chemical and/or electrochemical or and/or physical processes to modify their chemical and/or physical properties. For capillary pumps designed to vaporize non-aqueous liquid feed materials, for example, internal surface areas of capillary pump components may be treated using a silation process to render the surfaces hydrophobic and water repellant. Silation techniques may also be used to provide a protective coating and to increase the attraction between the liquid feed and the solid capillary pump component, thereby improving capillary pressure.

The surface treatment may alter the catalytic nature of the surface in order to promote reactions that would cause the low-volatility or non-volatile liquid components to evaporate and/or retard reactions that would cause the deposition of reaction products rather than allow such material to remain in the capillary pump as deposits that may degrade pump operation.

Capillary pump components preferably have generally similar or matched coefficients of thermal expansion to preserve the structural and mechanical integrity of the assembly during operation and thermal cycling.

Although the various components of capillary pumps described herein are described as discrete layers or components associated with or contacting one another, it will be recognized that one or more of the layers described herein may also be provided as integrated units having different pore sizes and different degrees of porosity across their thickness. Various layers may also be provided with a graded pore size and porosity distribution such that the area of one component in proximity to another component having different pore size and porosity characteristics provides a smoother transition between the layers. Combinations of capillary pump components may be provided in a stacked disk or tubular configuration, or in other configurations that may be suitable for particular applications.

Capillary pumps of the present invention may vaporize any type of liquid that may be vaporized under suitable conditions, e.g. attainable heat of vaporization and boiling point. Exemplary liquid fuels include gasoline, white gas, diesel fuel, kerosene, decane, JP8, alcohol such as ethanol and isopropanol, biodiesel, and combinations of liquid fuels. Other liquids may include water, fragrance compounds, crop treatments, insect repellants and attractants, antiseptics, inhalants and other medical compositions, and other liquids for which vaporization is desired, or as a means to precisely meter a vapor component, as might be incorporated into a production process, such as chemical vapor deposition.

One of the advantages of using improved capillary pumps of the present invention to vaporize liquid feeds is that constant, homogeneous vapor output is produced in a small, inexpensive, integrated device. Another advantage is that high vapor outputs may be achieved using an extremely small volume device. In general, the maximum liquid feed and vapor output flow rates of a capillary pump may be determined by ascertaining and adjusting, if necessary, the relationship between at least the following factors: (1) the total liquid viscous pressure drop as it travels from the liquid feed supply source to the vaporization zone; (2) the vapor viscous pressure drop as it travels from the vaporization zone to the vapor release; (3) the vapor pressurization, or vapor output velocity, which may be determined by the size of the orifice and other vapor release factors; and (4) the maximum capillary pressure, which is determined by the liquid permeability of the material forming the vaporization component. The first three factors increase as liquid flow increases, and the fourth factor remains fixed. When the arithmetic sum of the first three flows is equal to the fourth, the maximum flow may be generally attained.

In liquid fuel vaporization capillary pump applications, vaporized fuel is generally released from the vapor release component, mixed with oxygen and combusted in the general area outside the vapor release component of the capillary pump. In this circumstance, heat generated from combustion may be conducted to the heat transfer component, and from there to the vaporization component. Thermal energy generated by combustion may be returned to the heat transfer component by a high thermal conductivity solid member, such as a metal strut, heat pipe, capillary pump loop, etc. For example, conductive elements may form a part of a burner component that is in thermal communication with the thermal transfer component. Heat may be applied by an external source to initiate the production and release of vapor and combustion. Thereafter, a steady state condition is achieved in which a portion of the heat generated by combustion is used to produce vapor which, in turn, is combusted.

In operation, the capillary pump may include a starter mechanism to initiate the heating and vaporization process. Some of the same mechanisms used to generate start-up heat may also be used to ignite the vapor output in combustion applications. The startup heat may be provided by external means, such as an external flame. Alternatively or additionally, the startup heat may be provided by an externally powered heat source, such as an electrical heater. In other embodiments, the pump may have an integrated or self-generating means to provide the startup heat. The startup heat may be provided by any number of chemical reactions, both reversible and non-reversible. A non-reversible reaction includes the burning of fuel. A reversible reaction could involve hydration of lithium bromide for heat and dehydration for regeneration and reuse.

In one embodiment, the heat transfer component may comprise a chemically reactive substance that generates heat upon contact with an initiator substance. The reactive substance may be generally uniformly distributed within the heat transfer component, or it may be provided in discrete areas that may be conveniently contacted with the initiator substance. For example, the outer surface of the heat transfer component may include a catalytic material to generate the startup heat. The reactive substance may also be located at or near a filling aperture through which the initiator substance may be introduced. Thus, the heat transfer component may include an aperture for introducing the initiator substance to generate startup heat in addition to one or more opening(s) for release of vapor.

In an exemplary application, the heat transfer component may incorporate lithium bromide, or another similar substance as the chemically reactive heat generator, and the initiator substance may be an aqueous substance, e.g. water. Upon contact with the water, the lithium bromide forms a hydrate in an exothermic chemical reaction and in the process, produces heat that may be used as startup heat to initiate vaporization in the capillary pump. In combustion applications, the heat returned from burning the vapor may sustain continued vaporization, as well as reverse the hydration reaction. As a result, the reactive substance, e.g. lithium bromide, may be returned to its initial reactive state during operation of the capillary pump so that it may provide heat for the next startup cycle.

A catalytic reaction may also be employed to produce startup heat and/or vapor ignition. For example, a catalytic material may be associated with the heat transfer or heater component. This material may catalyze an exothermic reaction with the capillary pump input fuel or another substance in order to produce startup heat and/or vapor ignition.

Friction heating may also be used for startup heat and ignition of the capillary pump in liquid fuel and combustion applications. In one embodiment, a friction wheel may be positioned horizontally and flat against the top of the pump to provide a sufficient friction and heat transfer area. In another embodiment, an abrasive wheel and flint may be placed proximal to, e.g. adjacent to, the vapor release location of the vapor chamber component. In yet another embodiment, an ignition system is provided for converting mechanical or electrical energy to a spark, which ignites produced vapor. One or more spark electrode(s) may be incorporated into a heat return component in communication with the capillary pump, for example. Electrical conductors may be provided to supply voltage to the spark electrode(s) from an external voltage source, such as a piezoelectric element that may be compressed by mechanical force. In yet another embodiment of an integrated ignition system, a glow wire may traverse the vapor output area, e.g. above the vapor chamber component opening(s). Electrical conductors may provide power for glow wire(s) from an external power source, such as a battery, and appropriate switches may be provided for operation.

In some applications of the capillary pump, the pump may be associated with a burner component that may be mounted to or in proximity to the vapor chamber component. The burner component may have chamber(s) for mixing of air or another gas or mixture with the vapor. For example, air for mixing with the vaporized fuel may be provided at ambient temperature and pressure or, for particular applications, may be provided at an elevated temperature and/or pressure. The vapor mixture may exit the burner chamber and enter a combustion area. Various burner components known in the art may be employed.

Other components that may be incorporated in or provided in association with the pump may improve pump performance or safety. For example, a starter control may be incorporated to restrict operation of the capillary pump, introduction of liquid or release of vapor. An emission control component, such as a throttle or valve, or the like, may be included to provide controllable vapor release from the capillary pump. The control component may provide sufficient constraint to pressurize vapor enclosed by the substantially vapor-impermeable coating.

Other mechanisms for controlling vapor output include adjustment of the amount of heat supplied to the pump, changing the flow of liquid from the liquid supply layer or source, limiting or adjusting the release of vapor from the vaporization layer, varying the pore size of the vaporization layer, changing the configuration or arrangement of vaporization layer, varying the number, size and/or location of vapor permeable openings in ejection layer, modulating the amount of vapor released, adjusting the amount of heat provided to the vaporization region, etc. The quantity of heat supplied to the vaporization layer may be varied, for example, by adjusting the power provided an electrical resistive heating element or by modulating the amount of heat returned to the capillary pump from combustion. These parameters may likewise be modified to permit the capillary pump to efficiently vaporize with a variety of different liquids.

Various types of liquid reservoirs may be associated with and in fluid contact with capillary pumps of the present invention. The liquid reservoir may be designed to prevent or minimize spillage of liquid feed, particularly when the liquid is a liquid fuel for combustion, and particularly when the combustion device is intended to be portable, such as portable heating and lighting devices. A sealed, flexible, collapsible liquid reservoir may be employed, for example, in applications requiring liquid feed at substantially ambient pressures. For some embodiments, the liquid reservoir may be made of a material that is transparent or translucent, so that the liquid feed level is visible to the user. Suitable materials include thermoplastic materials, such as polymeric plastic materials, acrylic, polypropylene, and the like. In addition, the liquid feed reservoir may be vented to the atmosphere, e.g. include vent(s), to ensure that the pressure within the reservoir is equalized with ambient pressure during operation of the capillary pump. Furthermore, a sealable fitting providing access to the reservoir for refilling the liquid reservoir is generally provided.

In operation, feed liquid is drawn through the various capillary pump layers and vaporized in the vaporization layer. The produced vapor is released under pressurized or substantially unpressurized conditions and may be used directly, such as for combustion, or may be used in vapor-generating operations, such as vapor carburetion or fuel cell operations. In non-fuel applications, the vaporized product, such as fragrance compounds, antiseptics, crop treatments, insect repellants and attractants, and the like, is generally the desired output without requiring further treatment or operations.

Supply liquid is introduced to a liquid supply layer in non-pressurized form and at generally ambient temperature. At a later time, or simultaneous with liquid introduction, startup heat is provided from an external or internal heat source that may also be self-generating or integrated with the pump. As the vapor chamber component is heated, the heat is conveyed to the vaporization layer through the vapor chamber component and/or through an associated heat distribution component. A thermal gradient is established within the pump layers, with the hottest areas being in proximity to the heat source and vaporization region, and the coolest areas being in proximity to the liquid source, e.g. liquid supply layer. The temperature increase across various components of the capillary pump may be significant and reaches the boiling point of the liquid feed within or at the release surface of the vaporization layer. Where an insulation layer is provided, heat is prevented from migrating toward the liquid supply layer.

A substantial part of the liquid is vaporized within a vaporization region in or at the release surface of the vaporization layer. At times vaporization may occur in the vaporization layer, at the vapor release surface of the vaporization layer and/or in other areas between the vaporization layer and the vapor chamber component. Where a heat distribution layer is included, substantially even vaporization occurs across the small pores of the heat distribution layer at the point of contact with the vaporization layer or within the vaporization layer.

As vapor is generated, vapor pressure may accumulate within an enclosed space formed by the vapor-impermeable peripheral coating and a substantially vapor impermeable orifice disk. Under these circumstances, vapor is released under pressure through one or more openings in the orifice disk. During operation, the accumulation of vapor and heat promotes migration of the vaporization region through vaporization layer toward liquid supply layer. Simultaneously, capillary forces draw the cool feed liquid into the capillary pump and toward the vaporization zone, thus stabilizing the location of the vaporization region.

Pressurization of produced vapor within the enclosed space formed by the peripheral seal and subsequent release through one or more openings is generally sufficient to form one or more vapor jet(s) having a pressure greater than the pressure at which the liquid was supplied, and may be sufficient to form one or more vapor jet(s) having a velocity sufficient to entrain and mix with a gas to form a combustible mixture without requiring introduction of energy from an external source or a large or elaborate burner assembly. For most combustion applications, the capillary pump produces a vapor jet having a pressure greater than atmospheric using liquid fuel supplied at atmospheric pressure. The capillary pump of the present invention may alternatively use liquid supplied at a pressure greater than atmospheric to produce a vapor jet at a higher differential pressure.

The capillary pump of the present invention is suitable for use in numerous applications, including in combustion devices. Additional applications for the capillary pump or the individual various layers used in the capillary pump, include power sources for use in a variety of devices, including absorption refrigerators and other appliances, and thermal to electric conversion systems, such as thermophotovoltaic systems and thermoelectric thermopiles. A storage device, such as a battery, may be provided to store the electrical energy generated by the heat of combustion through the use of thermal-to-electric energy converters such as thermophotovoltaic, alkali metal thermal to electric conversion (AMTEC), fuel cell, or other such device for later return to the capillary pump and later use as startup heat. Various of those applications will be described generally below, with reference to schematic diagrams.

Figure 11:
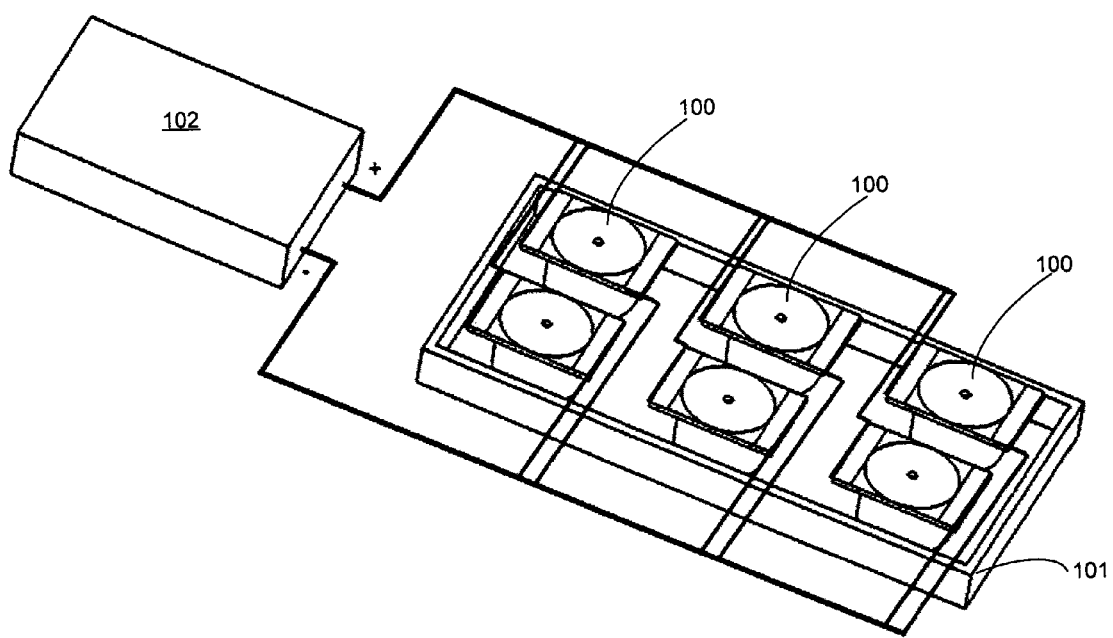
FIG. 11 is a schematic diagram illustrating a capillary pump array of the present invention.

Capillary pumps may be used singly or in coordinated arrays. FIG. 11 illustrates a capillary pump array of the present invention in which multiple capillary pumps 100, having integrated or associated heaters, are powered by a common power source and controller 102. The capillary pump array may be connected to power source and controller 102 in series or in parallel. The controller may be programmable and may provide automated and/or manual control of the capillary pump array. Capillary pump features such as heater input, liquid feed input, vaporization component temperature, vapor output, and the like may be monitored and programmably controlled. A common liquid feed reservoir 101 and/or liquid feed delivery system may also be used to provide liquid feed to capillary pumps 100 forming the array. Similarly, the output vapor from the array of capillary pumps may be collected within a common vapor pressurization chamber and subsequently released, thereby allowing the integrated array device to output one or more vapor streams having a total flow substantially greater than that of a single capillary pump.

Figure 12:
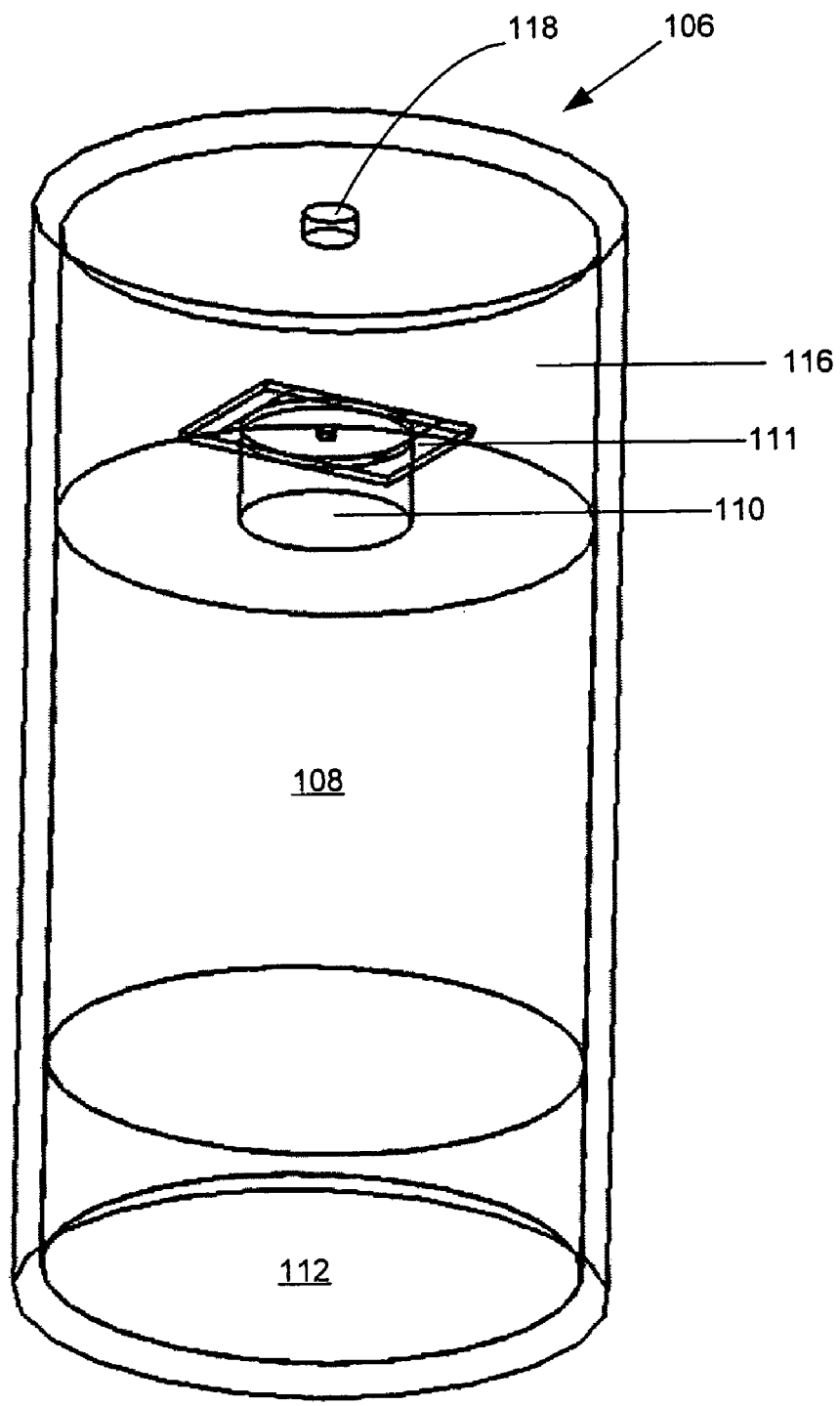
FIG. 12 is a schematic diagram illustrating a vaporizer device of the present invention comprising an integrated power source, liquid feed reservoir and capillary pump.

FIG. 12 shows a schematic illustration of a vaporizer device 106 having an integrated capillary pump, power supply and liquid feed reservoir suitable for applications such as vaporization of non-fuel liquids. In this embodiment, liquid feed reservoir 108 is in liquid communication with a liquid feed input surface of a capillary pump 110 comprising a vaporization component and an integrated heater 111. Liquid feed reservoir 108 may be refillable or in communication with a liquid feed supply system that monitors and controls liquid flow into the reservoir. Power source 112, such as a battery, is in electrical contact with the heater component of capillary pump (leads not shown). Capillary pump 110 releases vapor output to vapor collection space 116 and vapor is released through orifice 118. Although a single capillary pump 110 is illustrated, multiple capillary pumps may be incorporated in an array in a single vaporizer device and powered by the common power source. Release of vapor through orifice 118 is preferably controllable. This type of vaporizer device is useful for vaporization of liquid feed such as fragrances, antiseptics, insecticides or insect attractants, crop treatment agents, and the like. Vaporizer device 106 may be in operable communication with a monitoring and control device providing programmable and, optionally, remote control features.

Vaporizer device 106 may also be used for vaporization of pharmaceutical compositions in liquid carriers, provided that the pharmaceutical composition is stable at the temperatures required for liquid vaporization. Vaporizer device 106 may be provided with an inhalation tube conveying the vapor output from the orifice to a mask, cannula or another suitable inhalation device.

Figure 13:
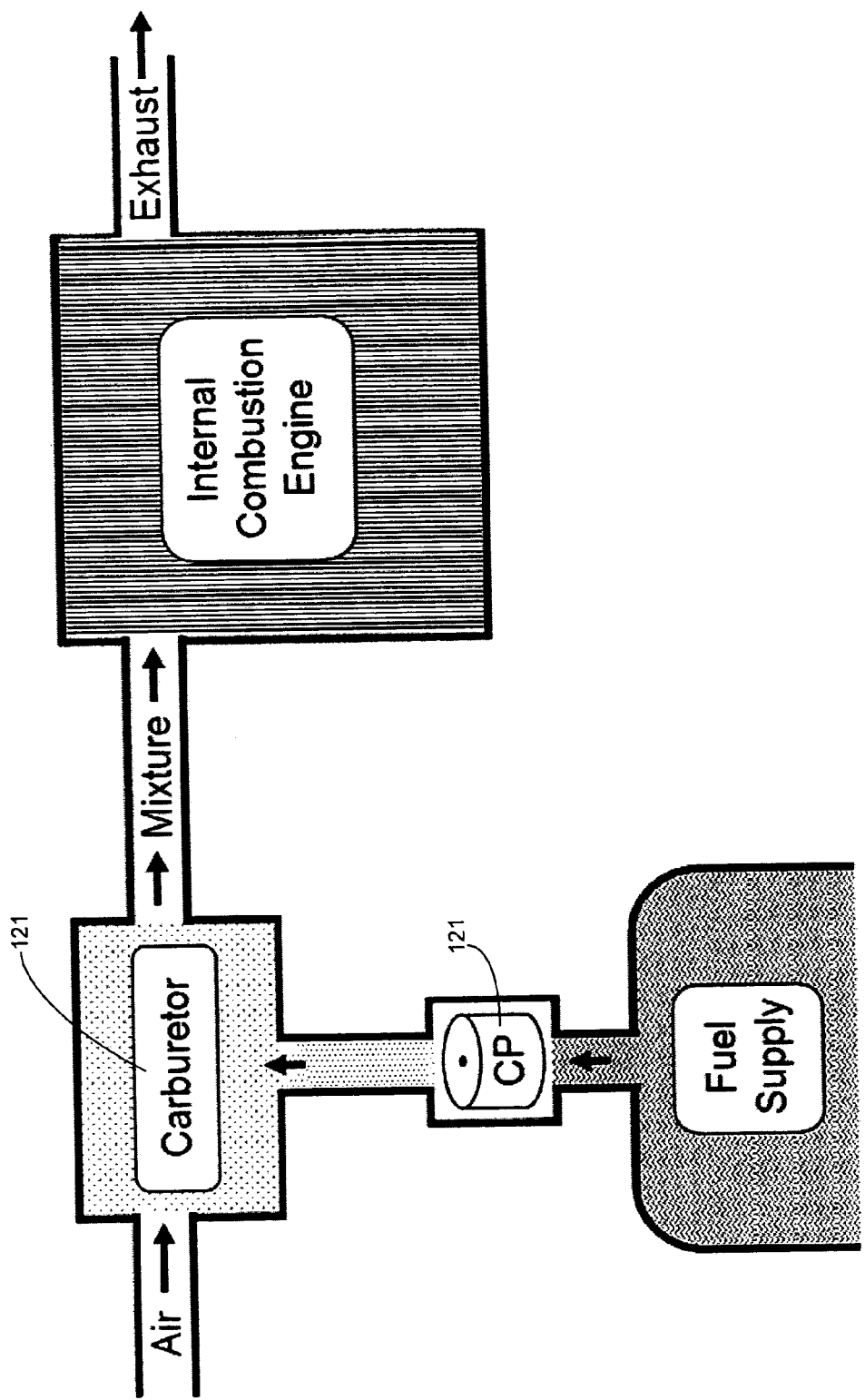
FIG. 13 is a schematic diagram illustrating the use of a capillary pump of the present invention in a vapor carburetion application providing vapor for ignition in an internal combustion engine.

FIG. 13 illustrates a capillary pump of the present invention in a vapor carburetion environment in which liquid feed is delivered to a liquid feed surface of capillary pump 120; vapor output from capillary pump 120 is delivered to a carburetor device 121, where it is mixed with air and injected to a combustion chamber, such as a combustion chamber in an internal combustion engine. Although a single capillary pump 120 is shown, it will be recognized that multiple capillary pumps may be used in combination to provide higher vapor output, as desired.

Figure 14:
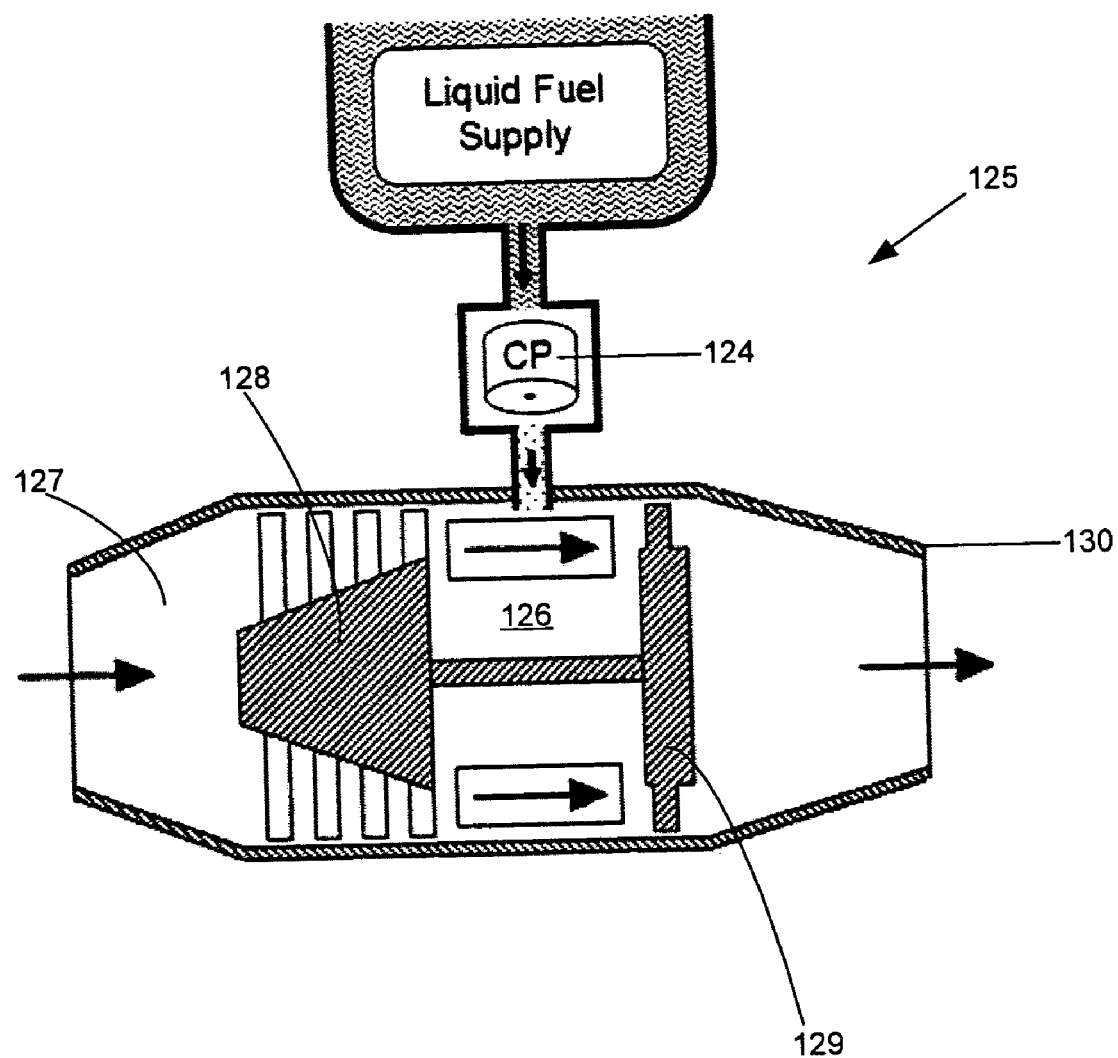
FIG. 14 is a schematic diagram illustrating the use of a capillary pump of the present invention to provide vapor for ignition and/or operation of a turbine device.

FIG. 14 illustrates yet another capillary pump environment in which a capillary pump 124, or an array of capillary pumps, provides vapor for use in turbine device 125. In this application, liquid fuel is conveyed through a liquid supply line to one or more capillary pumps 124 and vapor output from the capillary pump(s) is introduced to fuel combustion zone 126 of turbine device 125 in which a diffuser is in communication with compressor 128 that draws air or gases into combustion chamber 126. Combustion in chamber 126 drives turbine 129 and spent gases are discharged through nozzle 130. In some embodiments, the exhaust gases may be conveyed to a heat exchanger to extract heat for to feedback to power the capillary pump(s) for vaporization, or to preheat air before it enters the combustion chamber.

In one embodiment, an array of capillary pumps may be provided in a ring formation, for example, arranged around the periphery of the turbine combustion chamber to provide vapor directly to the combustion chamber to drive the turbine. The output of each capillary pump may provide fuel injection into the combustion chamber, and individual pumps in the array may be operated or programmed to coordinate fuel injection to the combustion chamber. Alternatively, a capillary pump or array of capillary pumps may provide vapor to a common vapor collection and distribution chamber having a ring configuration, where the vapor collection and distribution chamber provides vapor to the combustion chamber to drive the turbine. The generally uniform, homogeneous vapor output of one or more capillary pumps may provide an ignition or starter device in a turbine having improved performance. Alternatively, one or more capillary pumps may provide vapor both for turbine ignition and as a primary fuel source for turbine operation. Capillary pumps having externally powered heater components are generally used in turbine applications.

Figure 15:
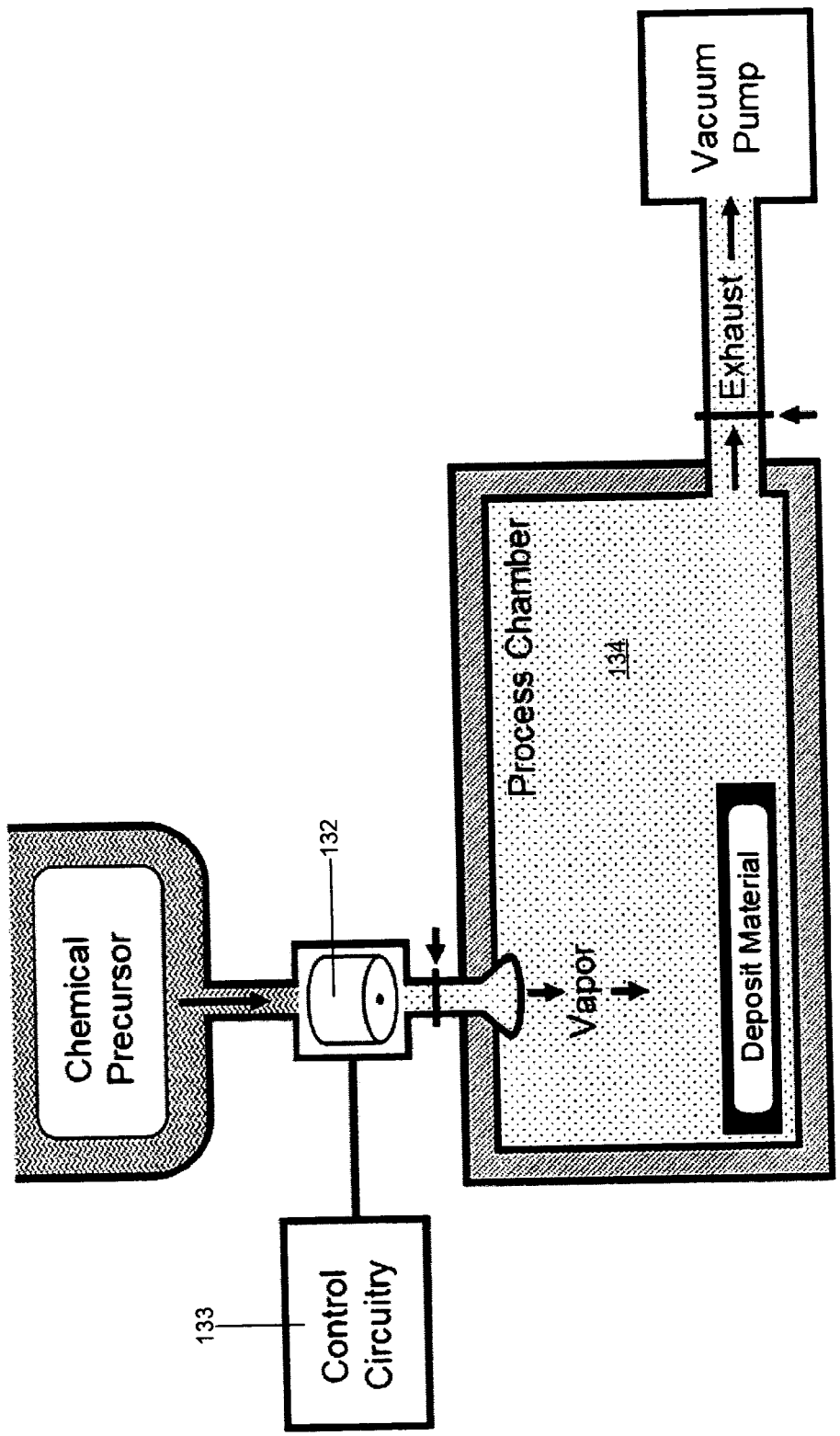
FIG. 15 is a schematic diagram illustrating the use of a capillary pump of the present invention to provide vapor in a vapor deposition process such as in connection with fabrication and processing of semiconductor wafers.

FIG. 15 illustrates another exemplary application for capillary pumps of the present invention in which one or more capillary pumps provide vapor in connection with a vapor deposition processing technique, such as are used in semiconductor fabrication and processing. As shown in FIG. 15, the liquid feed may be a liquid chemical precursor delivered to a liquid feed surface of capillary pump 132 controllable by controller 133. Vapor output from capillary pump 132 is delivered to process chamber 134, where it may be controllably deposited on or in a substrate, such as a semi-conductor wafer. In this embodiment, multiple capillary pumps may be arrayed to provide vapor output for deposition, and multiple substances may be vaporized by individual or arrayed capillary pumps for deposition in one or more process chambers.

Figure 16:
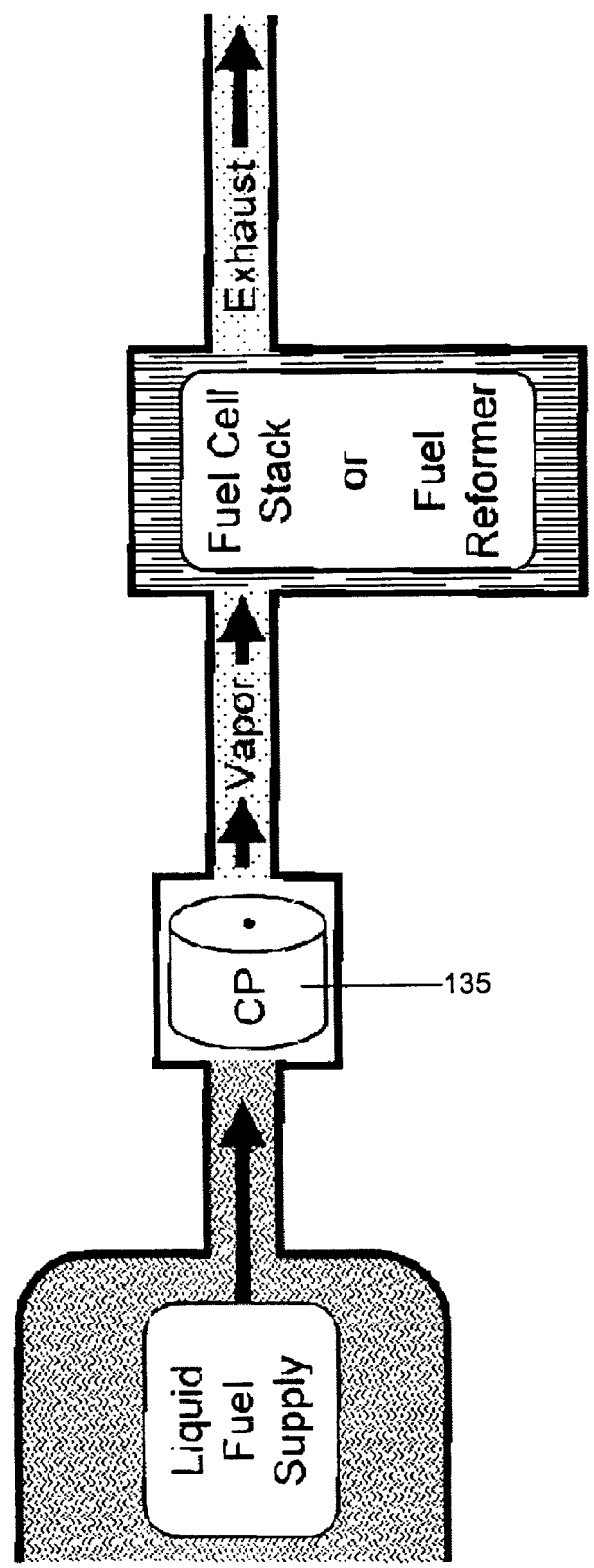
FIG. 16 is a schematic diagram illustrating the use of a capillary pump to provide vapor in connection with a fuel cell stack or fuel reformer.

FIG. 16 illustrates yet another application for capillary pumps of the present invention in connection with fuel cells, e.g. solid oxide fuel cells, in which one or more capillary pump(s) 135 are in liquid communication with a liquid fuel supply and provide vaporized fuel to a component, such as a membrane, of a fuel cell or a fuel reformer. Furthermore, the pump may provide pressurized alcohol vapor directly to a fuel cell membrane, e.g. hydrogen ion fuel cell. In some embodiments, the membrane may be integrated into the capillary pump. The pump may be coupled to a combustion component to provide heat and, in some applications to provide high-pressure vapor to a reformer for the fuel cell. For convenience, the pump may use the same liquid fuel source as the reformer. The heat of combustion from the fuel cell or fuel reformer may also be returned to the capillary pump to drive the continued operation of the pump.

Figure 17:
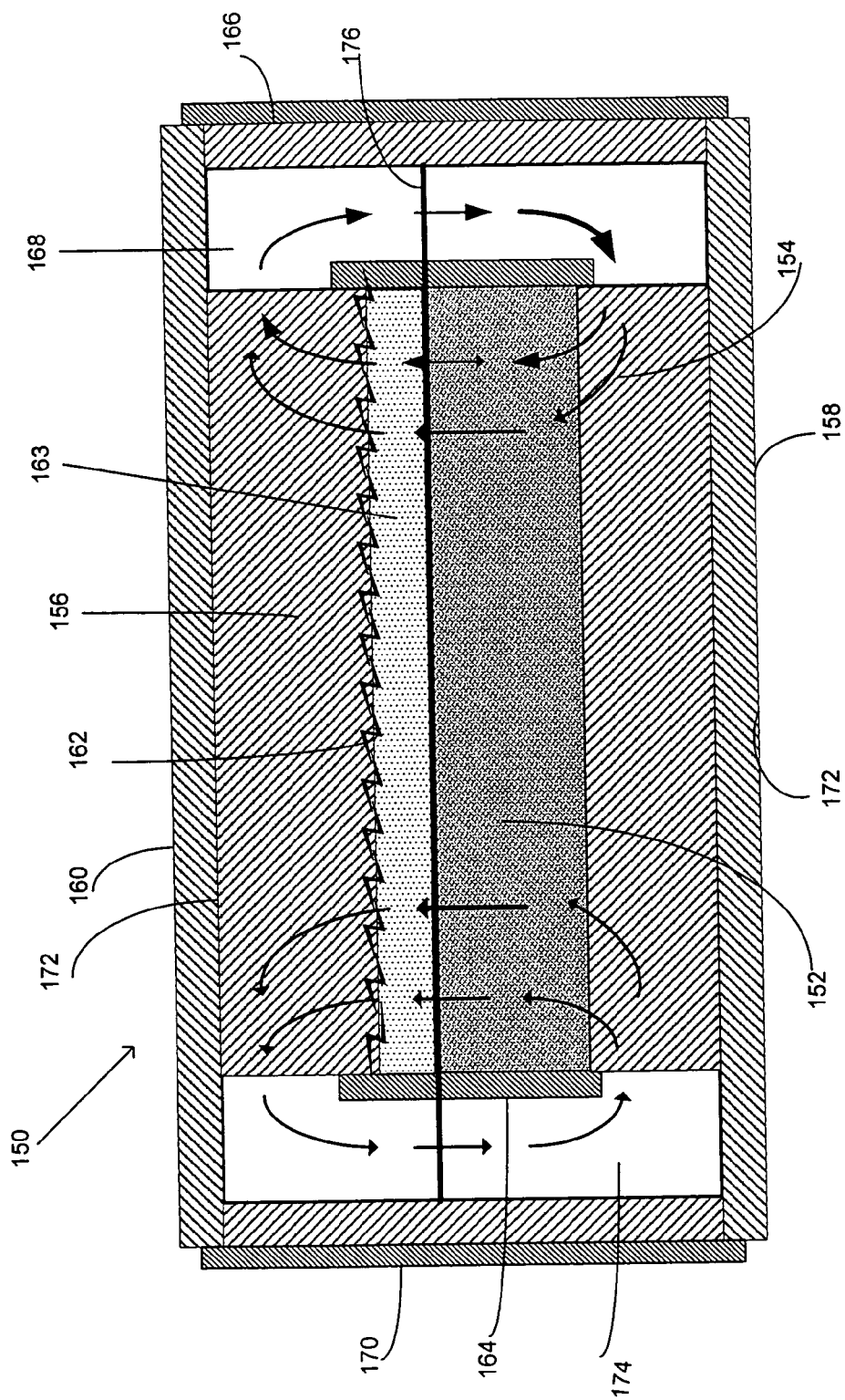
FIG. 17 is a schematic diagram illustrating the use of a vaporization component in association with an alkali metal thermal to electric conversion (AMTEC) system.

The capillary pump and/or capillary pump components may also be included in an alkali metal thermal to electric conversion (AMTEC) system to provide heat for running the system. AMTEC systems operate as thermally regenerative electrochemical cells by expanding sodium through the pressure differential at a sodium beta alumina solid electrolyte (BASE) membrane. An illustrative AMTEC system utilizing a vaporization component of the present invention is shown in FIG. 17.

A capillary vaporization layer having small-pored layer 152 composed of a material wetted by the liquid alkali metal may be sandwiched by a first large-pore ceramic layer 154 at a cool end 158 of the AMTEC cell and a second large-pore ceramic layer 156 an opposing hot end 160 of the cell. The small-pored layer 152 may include a vaporization zone 176 where liquid is converted into vapor. A membrane 162 that is permeable to ions, e.g. alkali metals, may be in contact or proximal to one surface of the small-pored layer 152 that is towards the hot end 160, so as to provide high-pressure gas to provide the density difference required for ion diffusion. In one embodiment in an AMTEC cell, the membrane 162 replaces the ejection layer and opening of the pump. The membrane may be an electrolyte material, such as beta alumina. A large-pored, electrically conductive material may be positioned between the small-pored layer 152 and membrane 162.

A first coating 164 may be provided at the periphery of at least the small-pored layer 152 and membrane 162 to permit vapor to accumulate and pressure to build. Furthermore, a dielectric ceramic material 166 may enclose a cycle space 168 for returning atoms 174 that are usually neutral, e.g. potassium, to be recycled and used in further AMTEC cell cycles. In some embodiments, a second coating 170 is provided to surround at least the dielectric ceramic material 166. A solid conductive ceramic shell 172 may also enclose the AMTEC cell at the hot end 160 and/or cool end 158. In one method of operation of the AMTEC cell according to the present invention, liquid is vaporized and pressure builds as ions in the vapor, e.g. potassium, diffuse through the membrane. Electrons are stripped off as they enter the membrane. Neutralized atoms are evaporated from the membrane surface and returned to the first large-pore layer to be reused.

Capillary pumps may also be used in thermophotovoltaic systems to convert thermal energy to electrical energy. The capillary pump may produce thermal energy, which is converted to radiant electromagnetic energy by one or more emitter(s) in thermophotovoltaic cell(s). Some emitters may be ceramic and may be doped with rare earth oxides. Examples of thermophotovoltaic cells include crystalline silicon cells, gallium antimonide (GaSb) infrared-sensitive cells, cells employing germanium, certain Group III-V materials such as gallium indium arsenide, and the like.

EXAMPLE

Numerous capillary pumps have been constructed, operated and tested. Capillary pumps having similar configurations but different sizes and vapor output properties are described below. Capillary pumps were assembled in a stacked disk configuration, in sizes having 5 mm, 13 mm and 19 mm diameters. Each of the capillary pumps had an aspect ratio (diameter to height) of about 1.

Each of the capillary pumps tested comprised a vaporizer component, an insulator component, and an orifice disk. The vaporizer components were all constructed from porous alumina ($Al_2O_3$) having a purity >96%, minimum bubble pressure (lowest pressure for steady flow of bubbles using isopropyl alcohol) of 10 psi; minimum air permeability of $0.03 \times 10^{-12}$ m$^2$; maximum thermal conductivity of 1.5 W/m-° K; coefficient of thermal expansion of $7-9 \times 10^{-6}$/° C.; and minimum strength (TRS) of 4 MPa.

The insulator components were all constructed from porous alumina-based material having a minimum permeability (air) of $5 \times 10^{-12}$ m$^2$; a maximum thermal conductivity of 0.3 W/m-° K; a coefficient of thermal expansion of $7-9 \times 10^{-6}$/° C.; and a minimum strength (radial crush) of 1 MPa. The surfaces of the insulator components facing the vaporizer components were polished. Multiple channels were provided in the insulator components in the liquid flow direction as vapor escape channels.

The orifice disks were constructed from non-porous alumina sintered to near full density. The orifice disks each had a single central orifice, a structure of lateral channels formed on an internal surface facing the vapor release surface of the vaporization component, and a transverse channel bisecting the lateral channels and the central orifice. The orifice disk lateral channels had a depth of 0.35-0.41 mm and a width of 0.16 mm, with spacing of 0.24 mm between lateral channels.

The vaporization, insulator and orifice disk components were all fabricated as disk (cylindrical) elements that were aligned and stacked, then sealed with a glass frit glaze. The glaze seal was about 0.20 mm thick and covered the entire periphery of the vaporization component, the lower 50-75% of the periphery of the orifice disk, and the upper 60-90% of the periphery of the insulator component. The glass seal thus covered the peripheral surface of the capillary pump except at the upper and lower peripheral surfaces.

The specifications for the 5 mm, 13 mm and 19 mm capillary pumps are described below.

5 mm Diameter Capillary Pump
Vaporizer component: 0.85 mm thick; 4.58 mm in diameter.
Insulator component: 2.79 mm thick; 4.58 mm in diameter; three through holes provided through the thickness of the insulator component in a radial arrangement 1.14 mm from the center and 0.36 mm in diameter.
Orifice disk: 1.49 mm thick; central orifice with inner diameter 0.49 mm chamfered to form an external diameter of 0.124 mm.

13 mm Diameter Capillary Pump
Vaporizer component: 0.85 mm thick; 12.49 mm in diameter.
Insulator component: 6.35 mm thick; 12.49 mm in diameter; with 19 through holes provided through the thickness of the insulator component having diameters of 0.36 mm provided in a regular, coordinated radial arrangement in the center and in two concentric rings at 30° spacing.
Orifice disk: 1.99 mm thick; central orifice with inner diameter 1.41 mm chamfered to form an external diameter of 0.338 mm.

19 mm Diameter Capillary Pump
Vaporizer component: 0.85 mm thick; 18.46 mm in diameter
Insulator component: 6.35 mm thick; 18.76 mm in diameter; 37 through holes having diameters of 0.36 mm in center and three concentric rings, inner ring at 30° spacing; outer ring at 20° spacing.
Orifice disk: 2.59 mm thick; central orifice with inner diameter 1.27 mm chamfered to form an external diameter of 0.507 mm.

Capillary pumps having the above-described structures were tested using kerosene fuel. Performance characteristics for the capillary pumps described above are provided in Table 1, below.

| Pump Size | Fluid Flow Rates | Energy Required for Maximum Flow |
| --- | --- | --- |
| 5 mm | 5-18 g/hour | 5 Watts |
| 13 mm | 3-120 g/hour | 35 Watts |
| 19 mm | 60-250 g/hour | 70 Watts |

The present invention has been described above in detail with reference to specific embodiments and figures. These specific embodiments should not be construed as narrowing the scope of the invention, but as illustrative embodiments. It is to be further understood that modifications and substitutions may be made to the described the capillary pumps, as well as to methods of its use, without departing from the broad scope of the invention.

We claim:

1. A capillary device for vaporizing liquid, comprising:
a vaporizer component having a liquid receiving surface to receive liquid and a vaporization area in which vapor is produced from the liquid;
a heat transfer component to convey heat to the vaporization component, the heat transfer component further comprising at least one opening to release vapor at a velocity greater than zero; and
a porous insulation component capable of at least substantially shielding the liquid from the heat prior to vaporization;
wherein the vaporizer component, heat transfer component and insulation component are in annular arrangement, and further wherein fluid flow is from a center area of the device to an outer periphery of the device.

2. The device of claim 1, wherein the heat transfer component is an internal heater proximal to the outer periphery of the device.

3. A device for vaporizing liquid, comprising:
a vaporizer component having a liquid receiving surface to receive liquid and a vaporization area in which vapor is produced from the liquid;
a heat transfer component to convey heat to the vaporization component, the heat transfer component further comprising at least one opening to release vapor at a velocity greater than zero; and
a porous insulation component capable of at least substantially shielding the liquid from the heat prior to vaporization; and
wherein the vaporizer component, heat transfer component and insulation component are in annular arrangement, and further wherein fluid flow is from an outer periphery of the device to a center area of the device.

4. The device of claim 1, wherein the heat transfer component is an internal heater proximal to the center area of the device.

* * * * *